US012803258B2

(12) United States Patent
Abrams et al.

(10) Patent No.: US 12,803,258 B2
(45) Date of Patent: Nov. 17, 2026

(54) ELECTRICAL POWER TRANSMISSION TOWER AND RETRACTABLE MAST FOR SAME

(71) Applicant: DUKE ENERGY CORPORATION, Charlotte, NC (US)

(72) Inventors: Ted A. Abrams, Fuquay-Varina, NC (US); Peter N. Henderson, Raleigh, NC (US); Jason Michael Bogdan, St. Petersburg, FL (US); Michael Whitley, St. Petersburg, FL (US); Andrew Chau, Boulder, CO (US); Mike Hoganson, Boulder, CO (US); Panos Kiousis, Boulder, CO (US)

(73) Assignee: DUKE ENERGY CORPORATION, Charlotte, NC (US)

( * ) Notice: Subject to any disclaimer, the term of this patent is extended or adjusted under 35 U.S.C. 154(b) by 181 days.

(21) Appl. No.: 18/825,655

(22) Filed: Sep. 5, 2024

(65) Prior Publication Data

US 2026/0066637 A1 Mar. 5, 2026

(51) Int. Cl.
*H02G 7/05* (2006.01)
*E04H 12/10* (2006.01)

(52) U.S. Cl.
CPC ............... *H02G 7/05* (2013.01); *E04H 12/10* (2013.01)

(58) Field of Classification Search
CPC ............ H02G 7/05; H02G 7/12; H02G 7/053; H02G 7/00; E04H 12/18; E04H 2012/006; E04H 12/06; E04H 12/00; E04H 12/10
USPC ........... 174/45 R, 40 R, 43, 45 TD; 248/200, 248/205.1; 52/651.02, 651.03, 40, 697
See application file for complete search history.

(56) References Cited

U.S. PATENT DOCUMENTS

| | | | | |
|---|---|---|---|---|
| 2,738,039 | A * | 3/1956 | Archibald | E04H 12/02 174/45 R |
| 3,713,195 | A | 1/1973 | Togiya et al. | |
| 4,027,441 | A | 6/1977 | Pitelyaev et al. | |
| 4,185,288 | A | 1/1980 | Dosch et al. | |
| 4,231,200 | A | 11/1980 | Henderson | |
| 4,696,135 | A | 9/1987 | Kallinger et al. | |
| 4,932,176 | A | 6/1990 | Roberts et al. | |
| 5,025,606 | A | 6/1991 | McGinnis et al. | |
| 5,995,063 | A | 11/1999 | Somoza et al. | |
| 6,353,419 | B1 | 3/2002 | Gates et al. | |

(Continued)

*Primary Examiner* — Angel R Estrada
(74) *Attorney, Agent, or Firm* — Myers Bigel, P.A.

(57) ABSTRACT

An electrical power transmission tower includes a lattice structure having a lower end configured to be anchored to the ground, and an opposite upper end. The lattice structure includes a plurality of parallel legs joined together in a polygonal cross-section configuration to define an internal space. At least one support arm extends outwardly from the lattice structure and at least one insulator is suspended from the at least one support arm. The at least one insulator is configured to support one or more electrical power transmission lines. A mast is movable within the internal space of the lattice structure along a vertical axis between a lowered position and a raised position. The mast supports various electronic equipment, such as cellular antenna arrays, remote radio unit (RRU) arrays, microwave antennas, imaging equipment, acoustic sensors, tectonic or motion sensors, thermal sensors, chemical sensors, and/or nuclear sensors.

42 Claims, 25 Drawing Sheets

(56) References Cited

U.S. PATENT DOCUMENTS

| | | | | |
|---|---|---|---|---|
| 6,513,299 | B1 * | 2/2003 | Damiano | H01Q 1/12 52/651.04 |
| 6,781,558 | B2 * | 8/2004 | Steinkamp | H01Q 1/1242 343/890 |
| 7,574,832 | B1 * | 8/2009 | Lieberman | E04H 12/182 52/118 |
| 9,385,413 | B2 * | 7/2016 | Pass | H01Q 1/1207 |
| 9,509,036 | B2 * | 11/2016 | Garmong | E04H 12/10 |
| 10,738,499 | B2 * | 8/2020 | Carrillo Alonso | E04H 12/341 |
| 10,920,444 | B2 * | 2/2021 | Kensinger | E04B 1/34305 |
| 11,619,062 | B2 * | 4/2023 | Abrams | H01Q 1/246 52/111 |
| 12,428,830 | B2 * | 9/2025 | Miles | E04C 3/005 |
| 12,448,804 | B2 * | 10/2025 | Seo | E04H 12/10 |
| 2005/0093766 | A1 | 5/2005 | Turner | |
| 2014/0318040 | A1 | 10/2014 | Edwards et al. | |
| 2015/0050070 | A1 | 2/2015 | Dykes et al. | |
| 2016/0130832 | A1 | 5/2016 | Zavitz | |
| 2016/0261019 | A1 | 9/2016 | Garmong et al. | |
| 2018/0179777 | A1 | 6/2018 | Tuerk | |
| 2020/0227810 | A1 | 7/2020 | Taylor et al. | |
| 2021/0207393 | A1 | 7/2021 | Konduc | |

* cited by examiner

ELECTRICAL POWER TRANSMISSION TOWER AND RETRACTABLE MAST FOR SAME

FIELD OF THE INVENTION

The present invention relates generally to towers and, more particularly, to electrical power transmission towers.

BACKGROUND OF THE INVENTION

Cellular communications towers are typically provided in urban and densely populated areas. However, tower siting is becoming increasingly more difficult for telecommunications service providers due to public opposition to erecting large towers in public spaces. As such, being able to leverage existing electric utility transmission structures is an attractive option. However, due to operational and construction issues associated with attaching cellular radios and antennas to electrical infrastructure, collocation of this equipment on electrical power transmission towers is the attachment of last resort for many telecommunications service providers. One reason is the need for electrical line safety clearance for installation and maintenance of the telecommunications equipment. Another reason is that existing electrical power transmission structures may not be structurally capable of supporting such additional loads. As such, collocation of cellular radios and antennas or other network devices on existing electrical power transmission towers may require structural modification, which can be costly.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, an electrical power transmission tower includes a lattice structure having a lower end configured to be anchored to the ground, and an opposite upper end. The lattice structure includes a plurality of parallel legs joined together in a polygonal cross-section configuration to define an internal space. At least one support arm extends outwardly from the lattice structure and at least one insulator is suspended from the at least one support arm. The at least one insulator is configured to support one or more electrical power transmission lines. A mast is movable within the internal space of the lattice structure along a vertical axis thereof between a lowered position and a raised position, and the mast is configured to support electronic equipment. A plurality of guide arms extend outward from the mast, and each guide arm is movably engaged with a respective one of the legs such that the guide arms are movable along the legs as the mast is moved between the lowered position and the raised position. In some embodiments, each guide arm is movable along a respective guide arm via a trolley assembly that is in rolling engagement with a respective leg. In some embodiments, each leg includes a wide flange beam, such as a WT beam, and each trolley assembly includes two pairs of wheels, wherein the wheels of each pair straddle opposing sides of the wide flange beam.

The mast is configured to support various electronic equipment, such as cellular antenna arrays, remote radio unit (RRU) arrays, microwave antennas, imaging equipment, and sensors to detect various anomalies, such as chemical anomalies, biological anomalies, radiological anomalies, nuclear anomalies, thermal anomalies, tectonic anomalies, acoustic anomalies, etc. For example, the Department of Homeland Security, law enforcement, and other organizations may utilize embodiments of the present invention for positioning various types of CBRN (chemical, biological, radiological, nuclear) defense sensors. Acoustic sensors may be utilized to detect gunshots. Tectonic or motion sensors may be utilized to detect the presence of vehicles in the area (e.g., in the right-of-way where a transmission tower is located) and to detect climbers on the transmission tower. Thermal sensors may be utilized to detect fire. Imaging equipment may be video or still, visible or infrared. The various equipment supported on the mast may be electronic or optical, either fiber optic or free-space optic.

In some embodiments, the mast includes a plurality of upper guide arms and a plurality of lower guide arms longitudinally spaced apart from the plurality of upper guide arms. Each leg includes a docking clamp movably secured thereto, and each docking clamp is configured to engage a respective one of the upper guide arms. A connecting rod is secured to each docking clamp and a tension binder is secured to the foundation adjacent each leg. The tension binders are configured to removably engage the respective connecting rods and restrain the docking clamps from movement when the mast is in the raised position, thereby restricting the mast from any unintended upward movement.

In some embodiments, each leg of the lattice structure includes an upper end portion and a lower end portion. An upper latch is movably secured to an upper portion of each leg, and a lower latch is movably secured to a lower portion of each leg. The upper latches and the lower latches are movable between open and closed positions. The upper latches are configured to support the mast by engaging with the lower guide arms when the mast is in the raised position. The lower latches are configured to prevent unwanted movement of the mast when the mast is in the lowered position by engaging with the lower guide arms. A latch actuator is operably associated with the upper latch and the lower latch for each leg and is configured to move the upper latch and the lower latch for each leg between open and closed positions.

The mast is raised and lowered via a lifting cable. One end of the lifting cable is secured to the mast and the other end of the lifting cable is operably associated with a winch system which is used to raise and lower the mast. The tower may include one or more sheaves or pulley wheels secured thereto and the lifting cable rides on these pulley wheels during raising and lowering operations. The lifting cable remains in place at all times except in those instances when the lifting cable is removed for inspection and/or replacement. The "captive" lifting cable is an advantageous feature of the present invention. Conventional lifting or hoisting methods make temporary use of cable provided by others, cable that is associated with a crane or service-truck winch. Those conventional methods often require personnel to be at elevated positions in order to attach or disconnect the lifting cable from the equipment, that is to say, for "rigging the load". Embodiments of the present invention do not require personnel to be up on top of the structure, working at heights near electrical conductors, in order to rig the load (i.e., the mast) for lifting, because the lifting cable can be attached or disconnected when the mast is resting on the maintenance saddles. Conventional methods use a lifting cable to raise and lower equipment or personnel. In contrast, embodiments of the present invention use a captive cable to raise and lower the movable mast complete with assembled equipment. The captive lifting cable and sheaves are not intended to move personnel. Furthermore, the manner of cable attachment, cable routing, and cable storage of the present invention facilitates replacement of the cable without any rigging at height. With the mast in the lowered maintenance position, using a leader-line, the lifting cable can be disconnected from the lifting lug, pulled through the sheaves, inspected and then replaced by using the leader-line to pull the inspected cable through the sheaves into the service position to be re-attached. With the electrical conductors de-energized, with no voltage present, the top sheave assembly is installed during initial construction, and subsequently inspected when the electrical conductors are again de-energized: de-energized because of electrical utility requirements, not because of mast tenant request. By simplicity and design, that top sheave assembly, including the sheave itself, the shaft, bearings, and end plates are inherently reliable with mean time between failure (MTBF) exceeding the interval between de-energized inspection and maintenance of the electrical conductors.

In some embodiments, the electrical power transmission tower includes at least one work platform movably secured to the lattice structure and pivotable relative to the lattice structure between a use position within the internal space and a stored position within the internal space. When the at least one work platform is in the stored position, the mast can move unimpeded within the internal space between the lowered and raised positions.

In some embodiments, each work platform includes a first section pivotably secured to one side of the lattice structure and a second section pivotably secured to an opposite side of the lattice structure. When the work platform is in the use position, the first section and the second section are coplanar and a free edge of the first section and a free edge of the second section are in adjacent spaced apart relationship such that the mast extends therebetween when in the lowered position.

In some embodiments, the electrical power transmission tower includes a hoist assembly movably secured to the lattice structure within the internal space. The hoist assembly is movable between a stowed position and an operative position and is configured to facilitate installation and removal of the electronic equipment from the mast when the mast is in the lowered position.

In some embodiments, the electrical power transmission tower includes an elongate hollow conduit secured to the lattice structure. The conduit includes an open first end and an opposite open second end. The conduit first end is positioned within the internal space adjacent the lattice structure lower end and the conduit second end is positioned within the internal space adjacent an intermediate portion of the lattice structure between the upper end and the lower end. Umbilical electrical cabling extends from the conduit to electrical equipment supported by the mast. In some embodiments, the umbilical electrical cabling external to the conduit is supported within a flexible cable carrier.

According to some embodiments of the present invention, a mast for use within an electrical power transmission tower includes an elongate tubular member configured to support electronic equipment, and a plurality of arms extending outwardly from a portion of the tubular member in circumferentially spaced apart relationship. A free end of each arm includes a trolley having a plurality of wheels, and each trolley is configured be in rolling engagement with the tower so that the mast is movable within an internal space of the tower. In some embodiments the tubular member includes an elongate upper portion defining a first longitudinal axis, and an elongate lower portion defining a second longitudinal axis. The lower portion is removably secured to the upper portion such that the first longitudinal axis and the second longitudinal axis are colinear. In some embodiments, the lower portion is removably secured to the upper portion via a connecting portion.

In some embodiments, the mast includes an elongate medial portion defining a third longitudinal axis, and one end of the medial portion is removably secured to the upper portion and an opposite end of the medial portion is removably secured to the lower portion such that the first, second and third axes are colinear.

At least one of the plurality of arms includes a stop member extending outward from an upper surface thereof. The stop member has a height relative to the arm upper surface that is greater than a height of the trolley relative to the arm upper surface. In some embodiments, the stop member is angled relative to the upper surface.

In some embodiments, the plurality of arms includes a plurality of upper arms and a plurality of lower arms longitudinally spaced apart from the plurality of upper arms.

In some embodiments, each of the plurality of arms includes a proximal end that is opposite the free end, and the proximal end includes a bracket that is configured to be removably secured to the tubular member via a plurality of fasteners.

In some embodiments, the mast includes a base cap secured to a lower free end portion of the tubular member, and a top cap secured to an opposite upper free end portion of the tubular member.

Electrical power transmission towers according to embodiments of the present invention are advantageous because they eliminate the need for technicians to climb or work above or near electrical power conductors. The mast may be lowered such that the various equipment (e.g., cellular radios, antennas, etc.) supported thereon can be easily and safely accessed via the one or more work platforms. Moreover, the mast is configured to allow multiple antenna centers in contrast to many conventional tower designs that only allow one array. In addition to eliminating the need to work above electrical power conductors, embodiments of the present invention also allow greater antenna mounting heights in order to serve more locations of need.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

Figure 1:
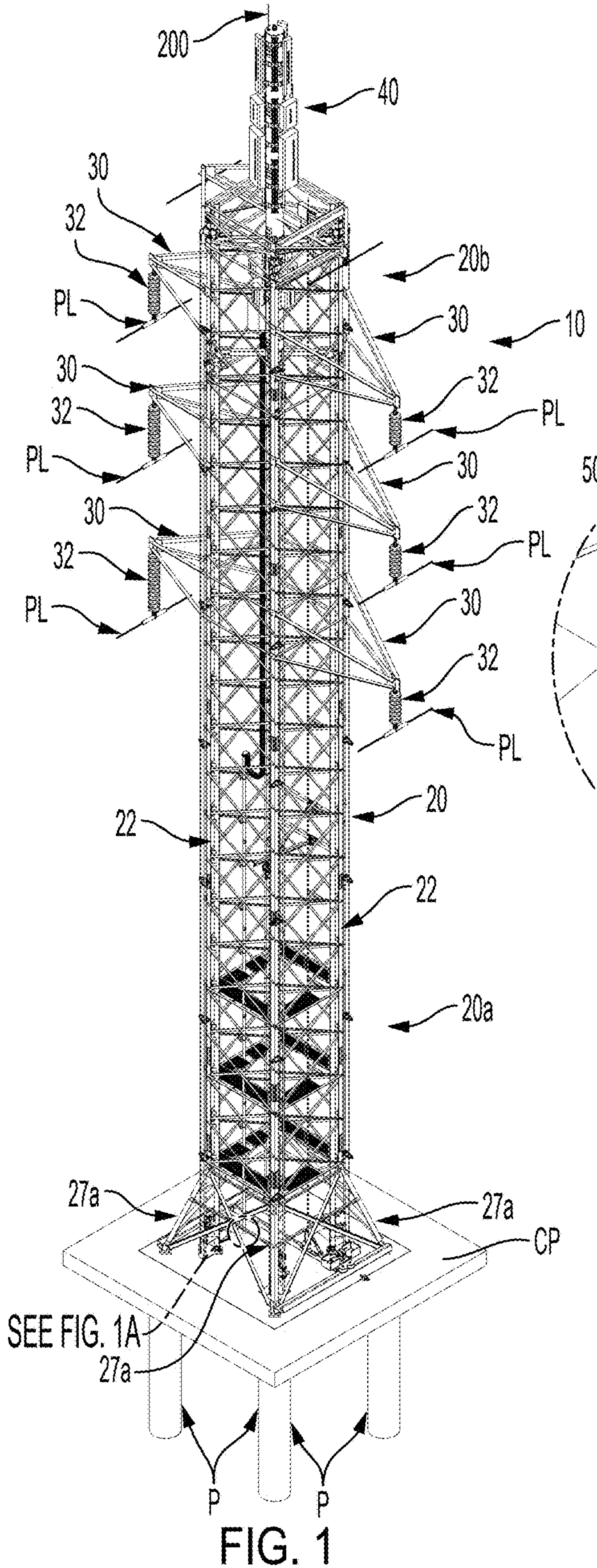
FIG. 1 is a top perspective view of an electrical power transmission tower according to some embodiments of the present invention, and illustrating a mast movably supported therein in a raised position.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

It will be understood that although the terms first, second, third, etc., may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

The terms "about" and "approximately", as used herein when referring to a measurable value, such as an amount or dimension and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measurable value may include any other range and/or individual value therein.

Aspects and elements of all of the embodiments disclosed herein can be combined in any way and/or combination with aspects or elements of other embodiments to provide a plurality of additional embodiments.

Referring now to the figures, an electrical power transmission tower 10 according to some embodiments of the present invention is illustrated. The tower 10 has a lattice structure 20 with a lower end 20*a* configured to be anchored to the ground or other structure, and an opposite upper end 20*b*. The lattice structure 20 includes a plurality of parallel legs 22 joined together in a polygonal cross-section configuration to define an internal space S with a vertical axis A. A mast 40 is movable within the internal space S between a lowered position (FIG. 3) and a raised position (FIG. 2) along the vertical axis A, and is configured to support various types of electronic equipment. A plurality of guide arms 70, 71 extend outward from the mast 40 (FIG. 6) and each guide arm 70, 71 is movably engaged with a respective one of the legs 22 such that the guide arms 70, 71 are movable along the legs 22 as the mast 40 is moved between the lowered position and the raised position.

In the illustrated configuration, the legs 22 are arranged in a quadrilateral cross-section configuration to define the internal space S having vertical axis A. However, the legs 22 may be arranged in various other polygonal cross-section configurations in other embodiments. In the illustrated embodiment, each leg 22 includes a first elongate portion 27 and a second elongate portion 28 connected to the first elongate portion 27 in adjacent spaced apart relationship by connecting members 29. In the illustrated embodiment, each first elongate portion 27 is an angle member and each second elongate portion is a WT beam (also referred to as a T-beam) having a web 28*a* and a flange 28*b* (see FIGS. 9B, 10B for example). However, other types of beams may be utilized for the legs 22, such as I-beams, etc. The connecting members 29 may be secured to the first and second leg portions 27, 28 via welding or mechanical fasteners, or via a combination of welding and mechanical fasteners. The first and second leg portions 27, 28 of the legs 22 may have various sizes depending on the size of the tower 10 and the type and quantity of equipment to be supported by the mast 40.

Each second leg portion 28 is configured to be anchored to the ground or other structure. Each first leg portion 27, at the lower portion 20*a* of the tower, is angled away from the second leg portion 28 to serve as a leg support 27*a* at each corner of the lattice structure lower end 20*a*, as illustrated. Each leg support 27*a* is configured to be anchored to the ground or other structure to provide stability to the tower 10.

Each leg support 27*a* and each second leg portion 28 may be anchored directly into the ground, or may be anchored to the ground via a respective foundation, such as a concrete pad or other structure. In the illustrated embodiment, each second leg portion 28 is secured to a respective flange 22*f* (FIG. 4A), and the flange 22*f* is secured to a foundation or structure via threaded fasteners F1, such as bolts, threaded rods and nuts, etc., as would be understood by one skilled in the art of the present invention. Each leg support 27*a* is secured to a respective flange 26*f* (FIG. 4A), and the flange 26*f* is secured to a foundation or structure via threaded fasteners F1, such as bolts, threaded rods and nuts, etc., as would be understood by one skilled in the art of the present invention. In the illustrated embodiment, the second leg portion flanges 22*f* and the leg support flanges 26*f* are secured to a concrete pad CP. The illustrated concrete pad includes a plurality of concrete piers P that are configured to be buried in the ground.

The legs 22 of the lattice structure 20 are connected to each other through a series of cross-braces 24 to provide structural rigidity. The legs 22 and cross-braces 24 may be formed from metal, such as steel (e.g., galvanized steel) or aluminum, although other materials may be utilized. The legs 22 and cross-braces 24 may be connected together via welding or mechanical fasteners, or via a combination of welding and mechanical fasteners. In some embodiments, the leg second elongate portions 28 are wide flanged beams, such as WT beams, and the leg first elongate portions 27 are angled members having an L-shaped cross section. In some embodiments, the WT beams may be formed from 6"×6" steel angles of various thicknesses. In some embodiments, the cross-braces 24 may include steel angles of various sizes and thicknesses, e.g., 5"×5", 4"×4", 3-½"×3-½", 3"×3", 2-½"×2-½", 2"×2", etc.

The illustrated electrical power transmission tower 10 includes a plurality of cantilevered support arms 30 extending outwardly from an upper portion of the lattice structure 20 in vertical spaced apart relationship. In the illustrated embodiment, the plurality of support arms are arranged as pairs of vertically spaced apart support arms 30, with each support arm 30 of a pair extending from respective opposite sides of the tower 10. However, the support arms 30 can be arranged in various configurations, including vertically staggered arrangements, etc. At least one insulator 32 is suspended from each support arm and is configured to support an electrical power transmission line PL. Electricity in such transmission lines PL typically is transported at voltages of over 200 kV, with voltages of 220 kV to 500 kV typical. However, various types of electrical power transmission lines PL may be supported by the tower 10, and embodiments of the present invention are not limited to any particular type of electrical power transmission line PL.

The lattice structure 20 is configured to be a robust, self-supporting structure, and is fully sufficient for vertical and axial loads, both static and dynamic. The lattice structure 20 is configured to meet or exceed the following standards: NESC—2017 separation from conductors and bonding; IEEE—142-1991 resistance to remote earth; ACI—318-02 foundation design; AISC-LRFD-99 strength and safety factors; ASCE-7-02 structural integrity for critical infrastructure; ANSI-222(G) or current applicable standard, Class III; Geotech safety factor 2.0; Seismic force amplification factor 3.0; and Topographic Category 4.0 (wind speed-up in all directions).

Figure 8A:
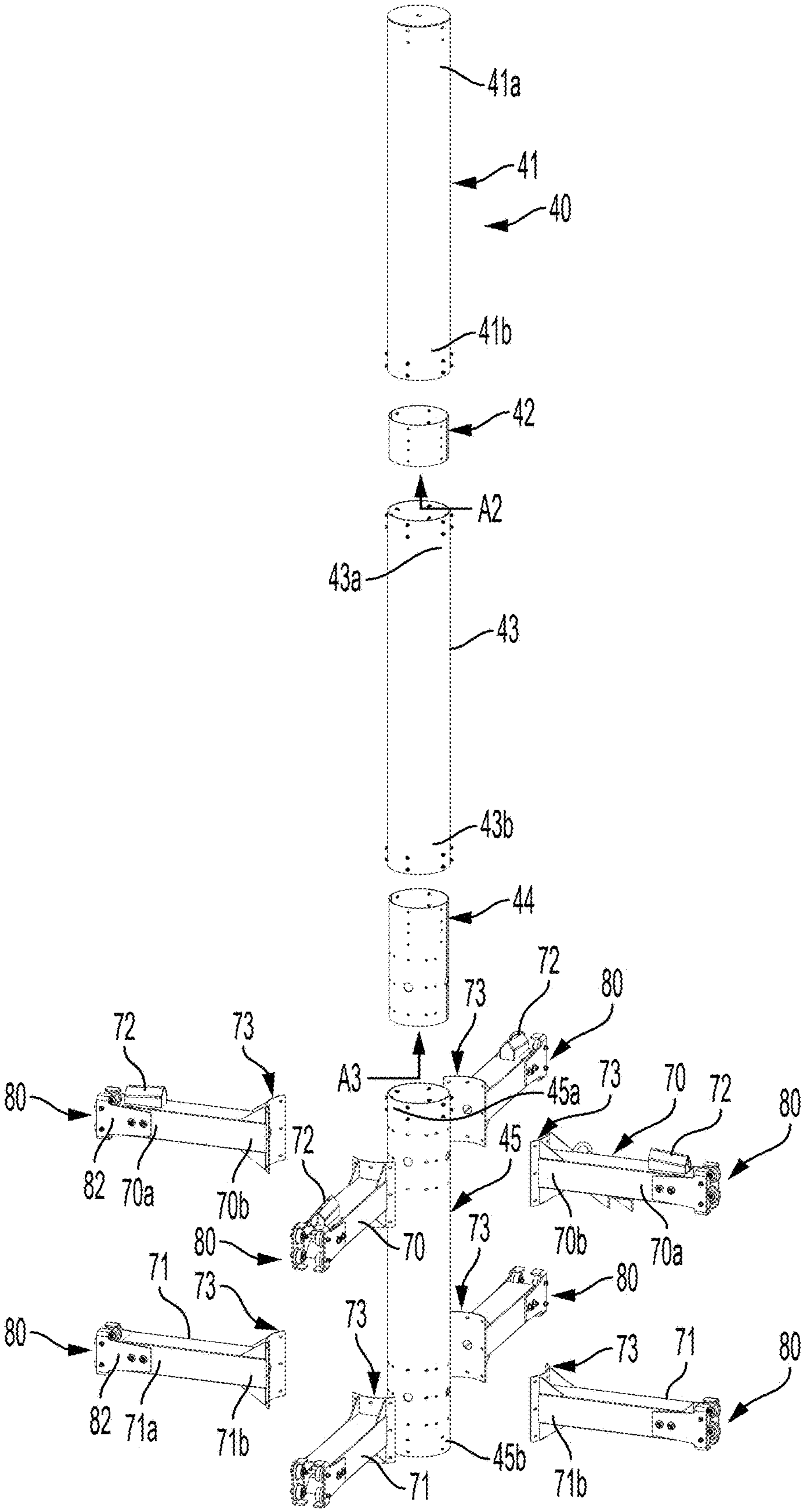
FIG. 8A is an exploded perspective view of a modular mast that can be utilized within an electrical power transmission tower, according to some embodiments.
Figure 8B:
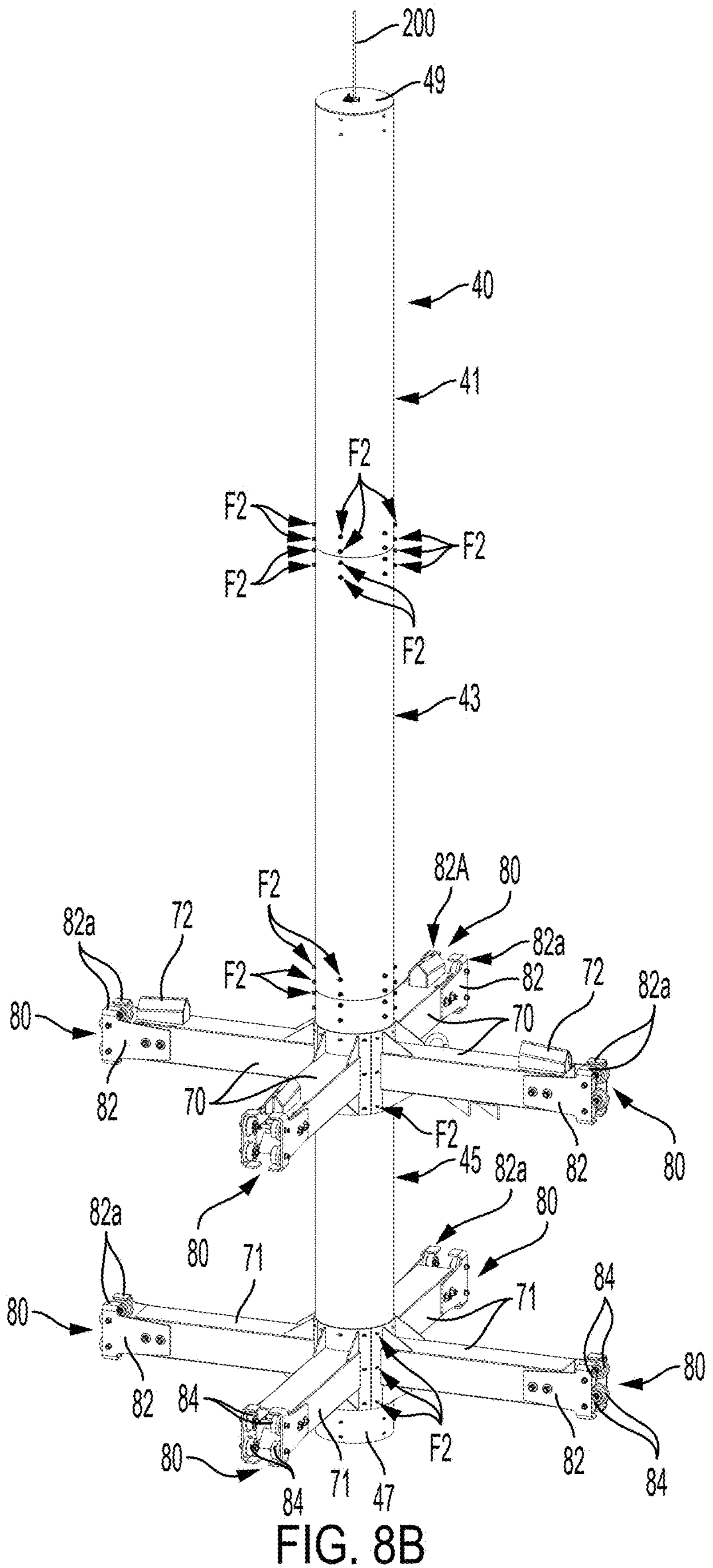
FIG. 8B is a perspective view of the modular mast of FIG. 8A in an assembled configuration.

The mast 40 is configured to support various electronic equipment, such as cellular radios and antennas. In some embodiments, the mast 40 is a twenty inch (20") diameter schedule 40 steel pipe, although other pipe sizes and materials may be utilized. In some embodiments, the mast 40 includes a plurality of tubular sections that are removably secured together. For example, as illustrated in FIGS. 8A-8B, in some embodiments, the mast 40 may include an upper section 41, and intermediate section 43 and a lower section 45 that are joined together by respective connecting sections 42, 44. The upper section 41 defines a first longitudinal axis A1, intermediate section 43 defines a second longitudinal axis A2, and the lower section 45 defines a third longitudinal axis A3. When the upper section 41, intermediate section 43, and the lower section 45 are joined together, the first longitudinal axes A1, A2, A3 are colinear.

In the illustrated embodiment, the upper section 41 and intermediate section 43 are joined together by connecting section 42 which is sized to be received within end portion 41*b* of the upper section 41 and within end portion 43*a* of the intermediate section 43. Fasteners F2, such as threaded bolts, screws, rivets, etc., are utilized to connect end portion 41*b* of the upper section 41 to the connecting section 42 and to connect end portion 43*a* of the intermediate section 43 to the connecting section 42. Similarly, intermediate section 43 and the lower section 45 are joined together by connecting section 44 which is sized to be received within end portion 43*b* of the intermediate section 42 and within end portion 45*a* of the lower section 43. Fasteners F2, such as threaded bolts, screws, rivets, etc., are utilized to connect end portion 43*b* of the intermediate section 43 to the connecting section 44 and to connect end portion 45*a* of the lower section 45 to the connecting section 44.

In other embodiments, the above configuration may be reversed, and the end portion 41*b* of the upper section 41 and end portion 43*a* of the intermediate section 43 may be received within the connecting section 42. Similarly, the end portion 43*b* of the intermediate section 43 and end portion 45*a* of the lower section 45 may be received within the connecting section 44.

In some embodiments, the overall length of the mast 40 may be shortened by including only the upper section 41 and the lower section 45. The modular functionality of the mast 40 allows the length thereof to be adjusted for use with towers of different heights, as well as for different use cases, e.g., where fewer antennas or cellular radios are needed, etc. In the embodiment where the mast includes only the upper section 41 and the lower section 45, the upper section 41 and lower section 45 may be secured directly together, or may be joined together with a connection section, such as connecting section 42 or connecting section 44.

Still referring to FIGS. 8A-8B, each of the upper and lower guide arms 70, 71 includes a respective bracket 73 at a proximal end portion 70*b*, 71*b* thereof. Each bracket 73 is configured to secure the respective guide arm 70, 71 to the lower section 45 of the mast 40 via fasteners F2, such as threaded bolts, screws, rivets, etc. In the illustrated embodiment, a base cap 47 is secured to end portion 45*b* of the lower section 45 via fasteners F2 and a top cap 49 is secured to the end portion 41*a* of the upper section 41 via fasteners F2. The top cap 49 includes an air terminal 200, in the illustrated embodiment.

Figure 7:
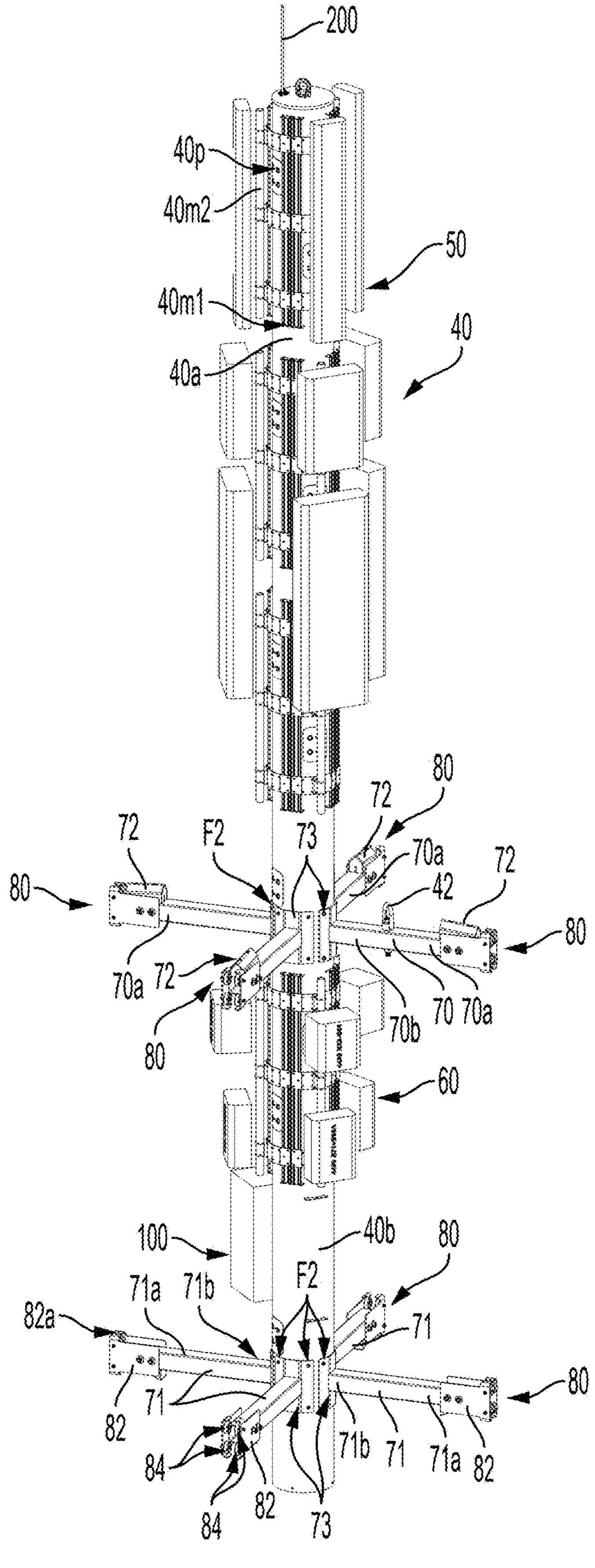
FIG. 7 illustrates the mast of FIG. 6 with a plurality of cellular antennas and radio antennas secured thereto, according to some embodiments.

Referring back to FIG. 7, the upper portion 40*a* and the lower portion 40*b* of the mast 40 are configured to support one or more types of electronic equipment. In the illustrated embodiment, the mast 40 is supporting cellular antenna arrays 50 and remote radio unit (RRU) arrays 60 (FIG. 7). However, various other equipment can be supported by the mast 40, such as microwave antennas, imaging equipment, and sensors to detect various anomalies, such as chemical anomalies, biological anomalies, radiological anomalies, nuclear anomalies, thermal anomalies, tectonic anomalies, acoustic anomalies, etc. For example, the mast 40 may support acoustic sensors for detecting gunshots, tectonic or motion sensors for detecting vehicles in the area (e.g., in the right-of-way where a transmission tower is located) and for detecting climbers on the transmission tower, and/or thermal sensors for detecting fire in the area. Imaging equipment may be video or still, visible or infrared imaging equipment.

In the illustrated embodiment, the mast 40 upper portion 40*a* (FIG. 6) is supporting the cellular antenna arrays 50 and the lower portion 40*b* is supporting the RRU arrays 60. In the illustrated embodiment, the mast 40 is sized to support three full tri-sector macro antenna arrays 50 at the upper portion 40*a*, and three full tri-sector RRU arrays 60 at a lower portion 40*b*. As illustrated in FIG. 1, a portion of the mast 40 extends through the upper end 20*b* of the lattice structure 20 when the mast 40 is in the raised position. This allows the cellular antenna arrays 50 to extend above the tower 10 and to also extend above the electrical power lines PL supported by the tower 10.

Figure 6:
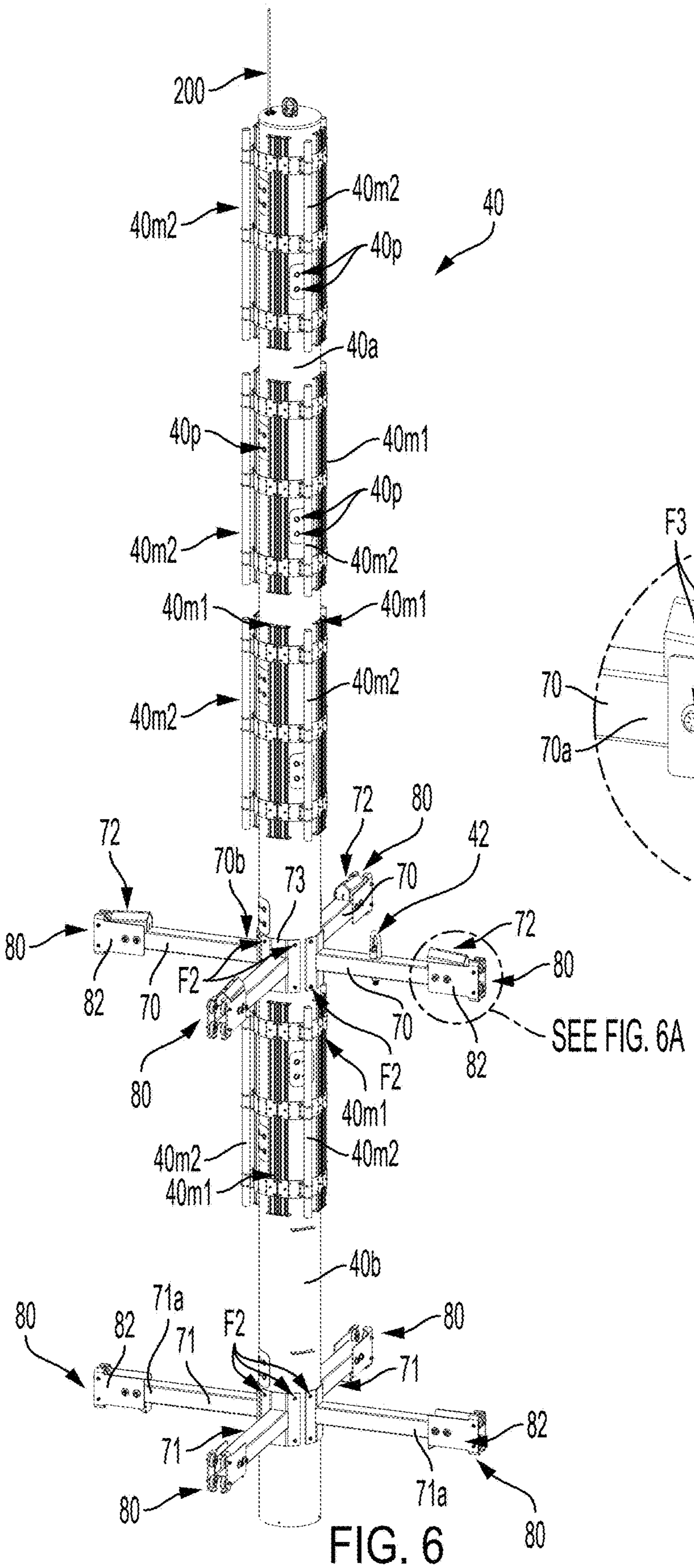
FIG. 6 is a perspective view of a mast that can be utilized with an electrical power transmission tower, according to some embodiments.

The mast 40 includes a plurality of guide arms 70, 71 that extend outward therefrom in circumferentially spaced-apart relationship (e.g., spaced equally at 120° azimuthal orientation), as illustrated in FIGS. 6 and 7. In the illustrated embodiment, the guide arms are arranged as a plurality of upper guide arms 70 and a plurality of lower guide arms 71 longitudinally spaced apart from the upper guide arms 70. The guide arms 70, 71 may be secured to the mast 40 via welding or mechanical fasteners, or via a combination of welding and mechanical fasteners. In the illustrated embodiment, each of the upper and lower guide arms 70, 71 includes a respective bracket 73 at a proximal end portion 70*b*, 71*b* thereof. Each bracket 73 secures the respective guide arm 70, 71 to the mast 40 via fasteners F2, such as threaded bolts, screws, rivets, etc.

The illustrated mast 40 in FIGS. 6 and 7 includes mounting brackets 40*m*1 hat support mounting posts 40*m*2 and to which the various electronic equipment can be attached. The illustrated mast 40 also includes cable passages 40*p* that allow electrical cabling 600 routed up through the interior of the mast 40 to pass therethrough for connection to equipment mounted on the mounting posts 40*m*2.

Each guide arm 70, 71 is configured to be movably connected to a respective leg 22 of the tower 10 and is movable along the leg 22 as the mast 40 is moved between lowered and raised positions. Each guide arm 70, 71 may be a steel wide flange beam or tube, although other shapes and materials may be utilized. In the illustrated embodiment, each guide arm 70, 71 has a distal end portion 70*a*, 71*a* and a trolley assembly 80 is secured to the distal end portion 70*a*, 71*a*. In the illustrated embodiment, each trolley assembly 80 includes a pair of spaced apart arms 82 that are attached to a respective guide arm 70, 71. In the illustrated embodiment, the arms 82 are secured to each respective guide arm 70, 71 via multiple fasteners F3, such as bolts. However, various other types of fasteners may be utilized, and each arm 82 may be welded to a respective guide arm 70, 71 in some embodiments.

A pair of wheels 84 are supported for rotation on an inward side of each arm 82. Each pair of wheels 84 is configured to engage and roll along the flange inner surface 28*bi* of a respective second portion 28 of a leg 22. The illustrated trolley assembly 80 of each guide arm 70, 71 is configured such that the wheels 84 of each pair straddle opposing sides of a leg second portion 28. However, embodiments of the present invention are not limited to the configuration of the illustrated trolley assembly 80. Various types of trolley assemblies 80 may be utilized with the guide arms 70, 71, including various numbers and configurations of wheels.

Figure 6A:
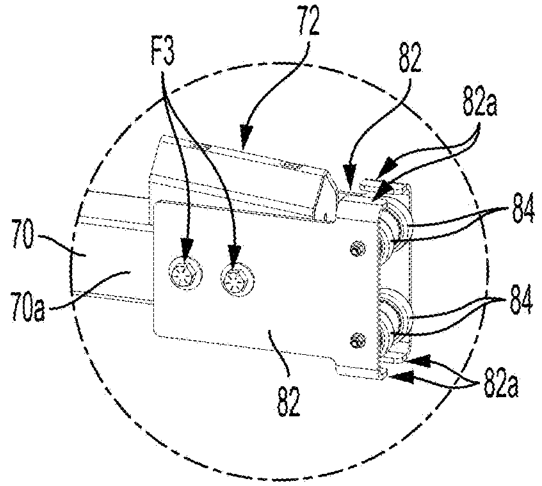
FIG. 6A is an enlarged view of a trolley assembly secured to the distal free end of a guide arm, according to some embodiments.

In the illustrated embodiment, each arm 82 includes a pair of tabs or ears 82*a* that extend over a respective wheel 84 of a trolley assembly 80, as illustrated in FIG. 6A. These ears 82*a* are configured to be positioned closely to the web 28*a* of the second leg portion 28 so as to prevent foreign objects from contacting the wheels 84 of the trolley assembly 80 or otherwise causing interference with the operation of the wheels 84 of the trolley assembly 80.

Each leg 22 of the lattice structure 20 includes an upper latch 110 (FIGS. 11C, 12D) movably secured to an upper portion 22*b* of the leg 22, and a lower latch 120 (FIGS. 9A, 9B, 10B) movably secured to a lower portion 22*a* of the leg 22. The upper latch 110 and the lower latch 120 are configured to pivot between open and closed positions via respective hinges 111, 121 that are secured to each leg 22. In the illustrated embodiment, each hinge 111 of an upper latch 110 is secured to a first leg portion 27 of a respective leg 22 via flange members 111*m*. In the illustrated embodiment, each flange member 111*m* is secured to a respective first leg portion 27 via fasteners 111*f*, such as bolts, rivets, etc. However, each flange member 111*m* may be secured to a respective first leg portion 27 via welding or a combination of welding and fasteners.

Figure 11:
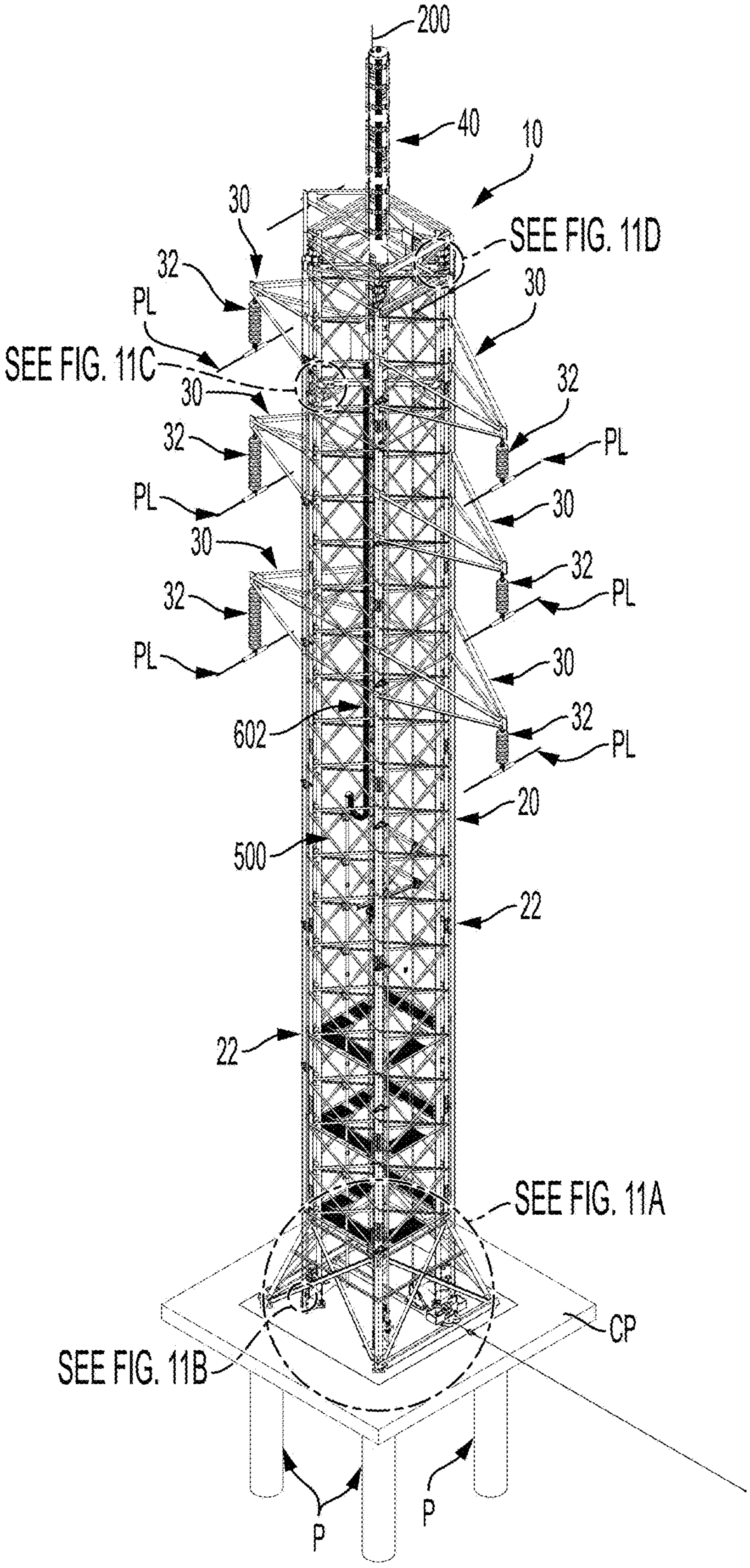
FIG. 11 is a top perspective view of the electrical power transmission tower of FIG. 2 with the mast in the raised position and some of the maintenance platforms in a stowed position, according to some embodiments.
Figure 11C:
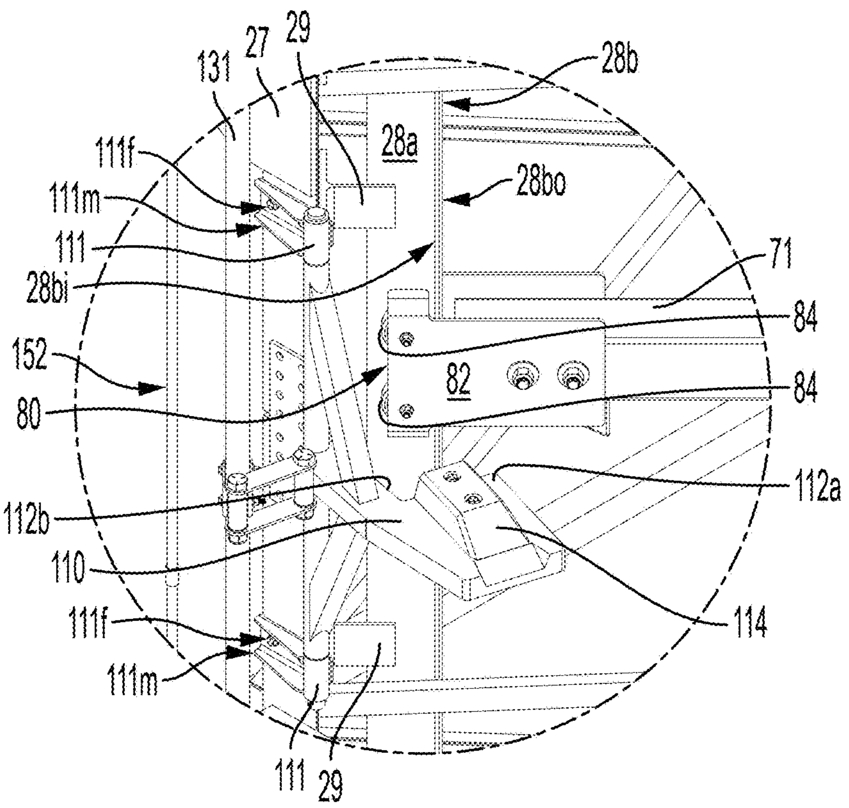
FIG. 11C is an enlarged view of an upper portion of the electrical power transmission tower of FIG. 11 and illustrating one of the upper latches in an open position to allow the mast to be raised, according to some embodiments.
Figure 12:
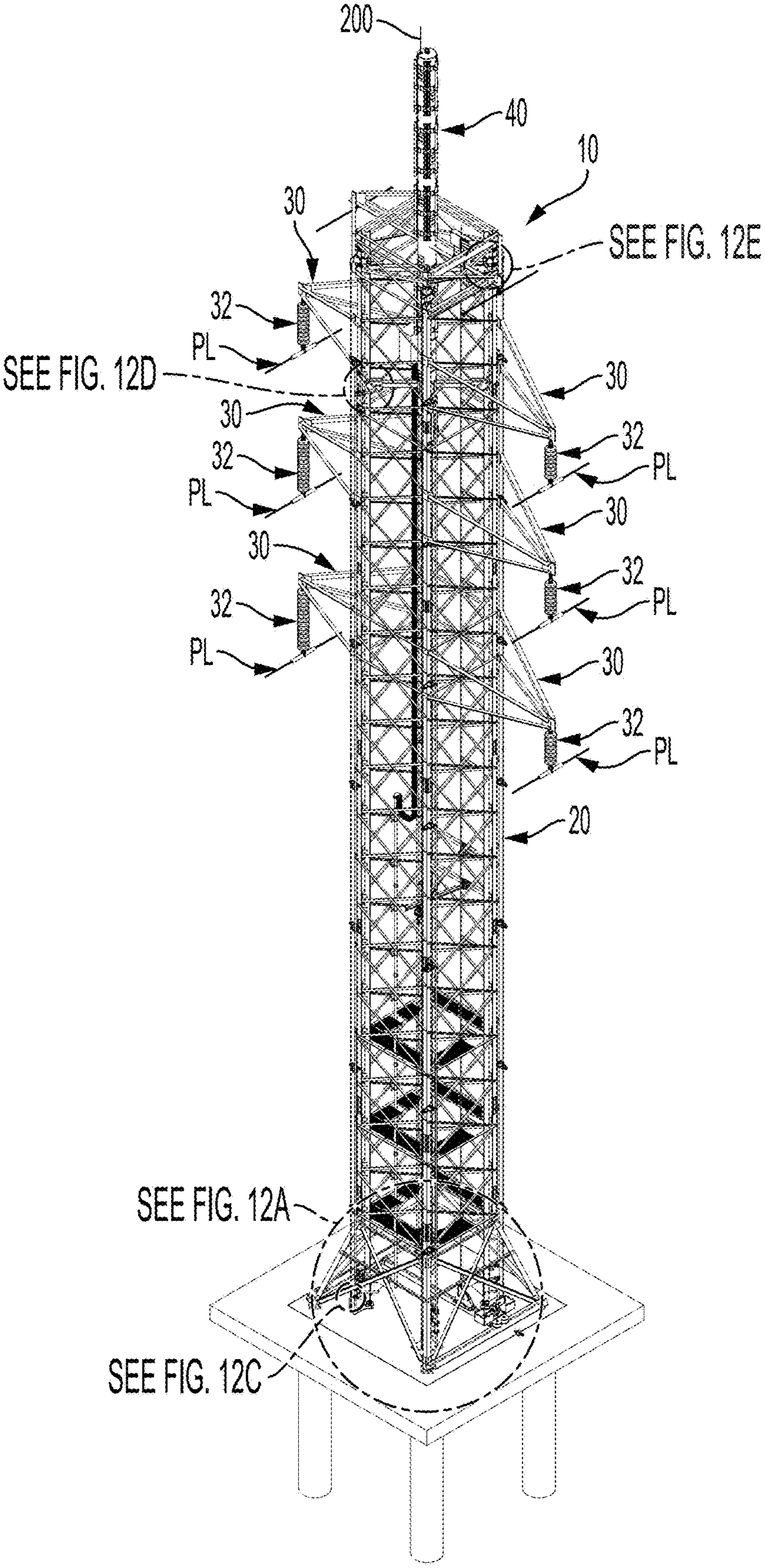
FIG. 12 is a top perspective view of the electrical power transmission tower of FIG. 2 with the mast in the raised position and some of the maintenance platforms in a stowed position, according to some embodiments.
Figure 12A:
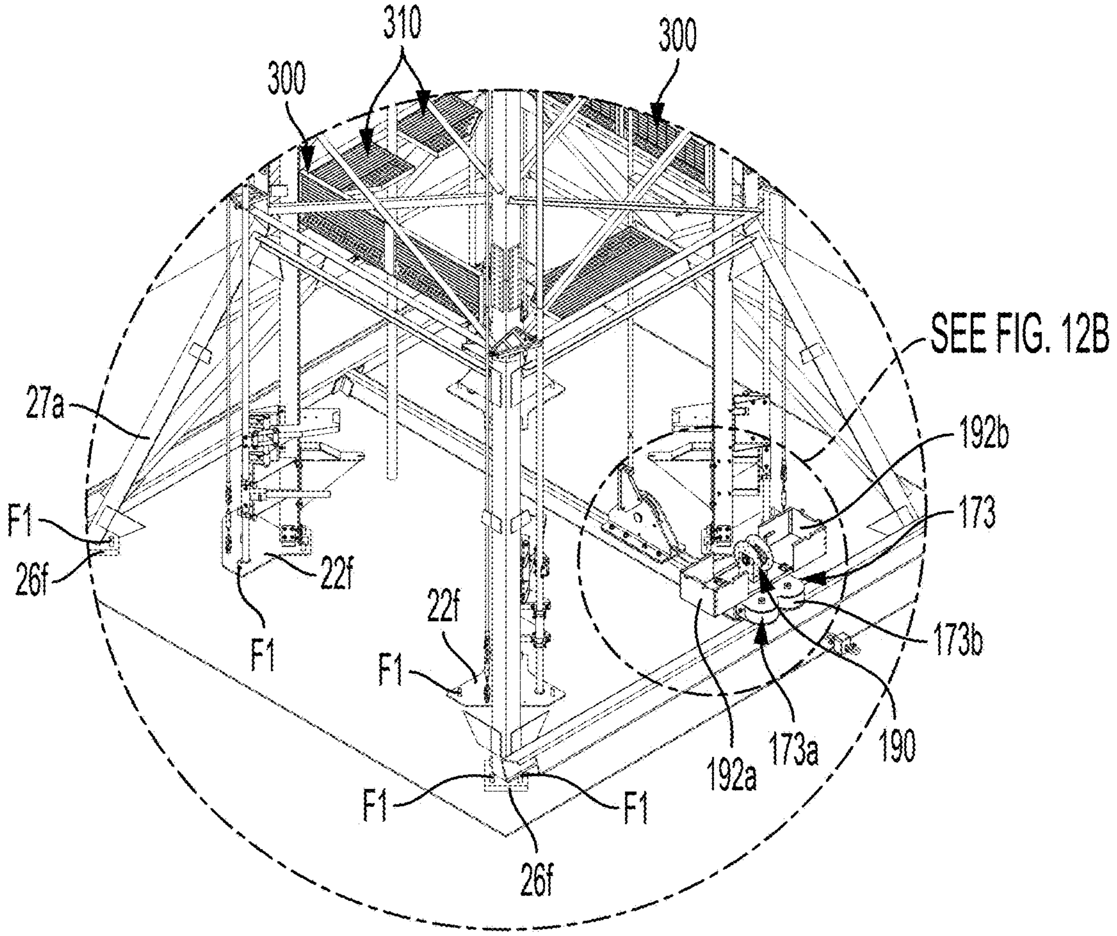
FIG. 12A is an enlarged view of a lower portion of the electrical power transmission tower of FIG. 12 illustrating the position locks engaged, the tension binders engaged, and some of the maintenance platforms in a stowed position.
Figure 12B:
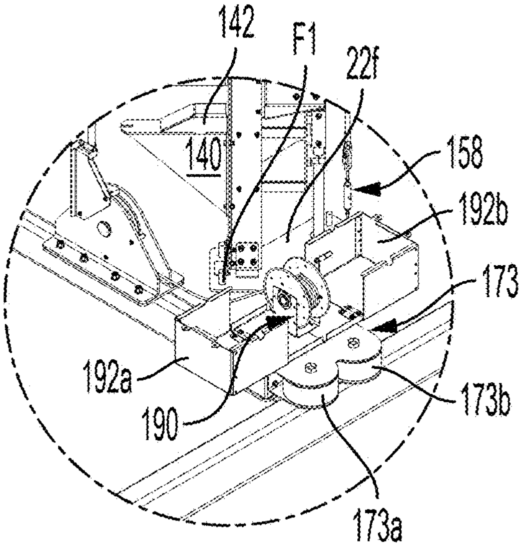
FIG. 12B is an enlarged view of the mast lifting cable wound around a storage spool after the upper latches are in the closed position and supporting the mast in the raised position, according to some embodiments.
Figure 12C:
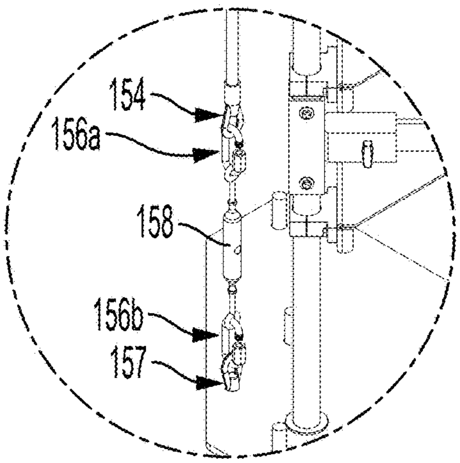
FIG. 12C is an enlarged view of one of the tension binders in an engaged state, according to some embodiments.
Figure 12D:
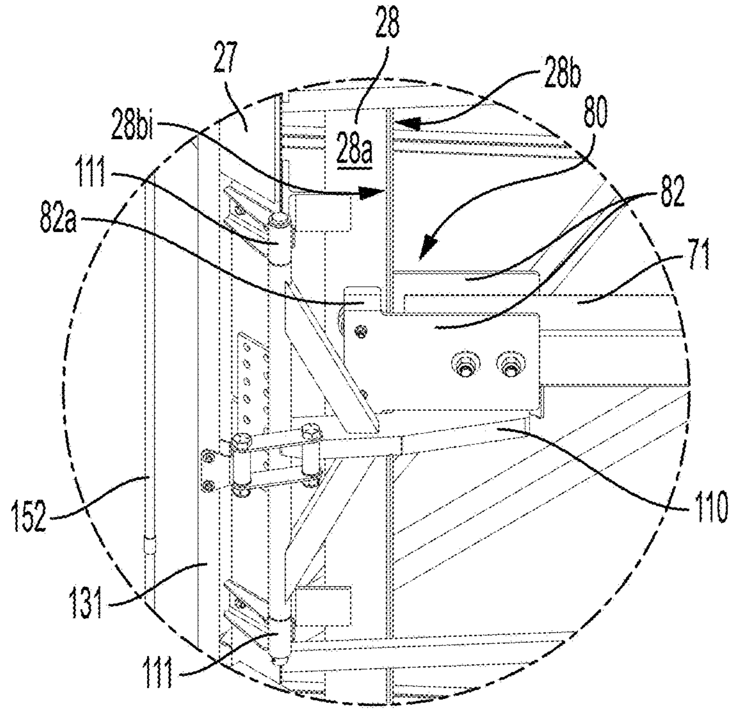
FIG. 12D is an enlarged view of an upper portion of the electrical power transmission tower of FIG. 12 illustrating one of the upper latches in a closed position supporting the mast in the raised position, according to some embodiments.

Each hinge 121 of a lower latch 120 is secured to a respective leg 22 via a flange member 121*m* that is secured to the web 28*a* of each leg second portion 28 via fasteners F4, such as bolts, rivets, etc. However, each flange member 121*m* may be secured to a respective web 28*a* via welding or a combination of welding and fasteners The upper latch 110 of each leg 22 is configured to support a respective lower guide arm 71 when the mast 40 is in the raised position and thereby support the mast 40 in the raised position. Each upper latch 110 is pivotably secured to a respective leg 22 via hinge 111, and is movable between an open position and a closed position. FIG. 12D illustrates an upper latch 110 of a leg 22 pivoted via hinges 111 to the closed portion, and FIG. 11C illustrates an upper latch 110 of a leg 22 pivoted via hinges 111 to the open position. When the upper latches 110 of the legs 22 are all in the closed position, the guide arms 71 of the mast 40 rest upon the upper latches to support the mast 40 in the raised position. When the upper latches 110 of the legs are all in the open position, the mast 40 can be lowered.

Figure 9:
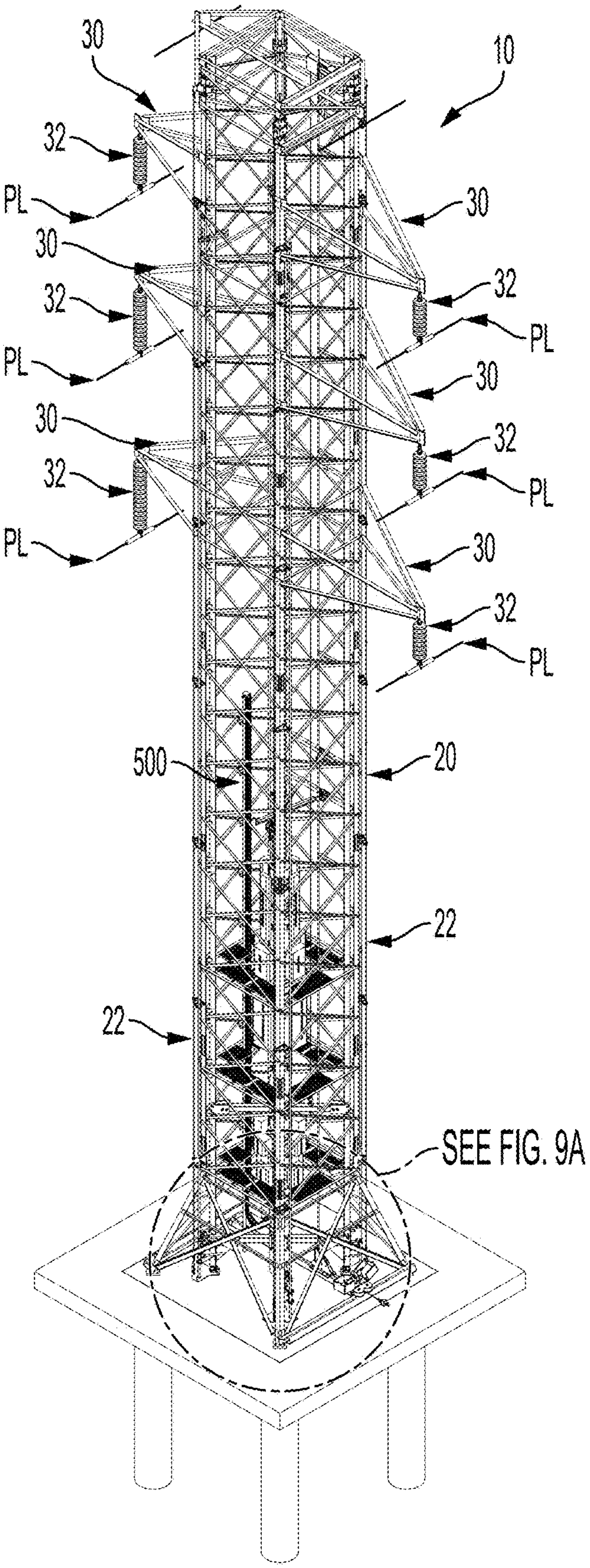
FIG. 9 is a top perspective view of the electrical power transmission tower of FIG. 3 with the mast in the lowered position and some of the maintenance platforms in a deployed position, according to some embodiments.
Figure 9A:
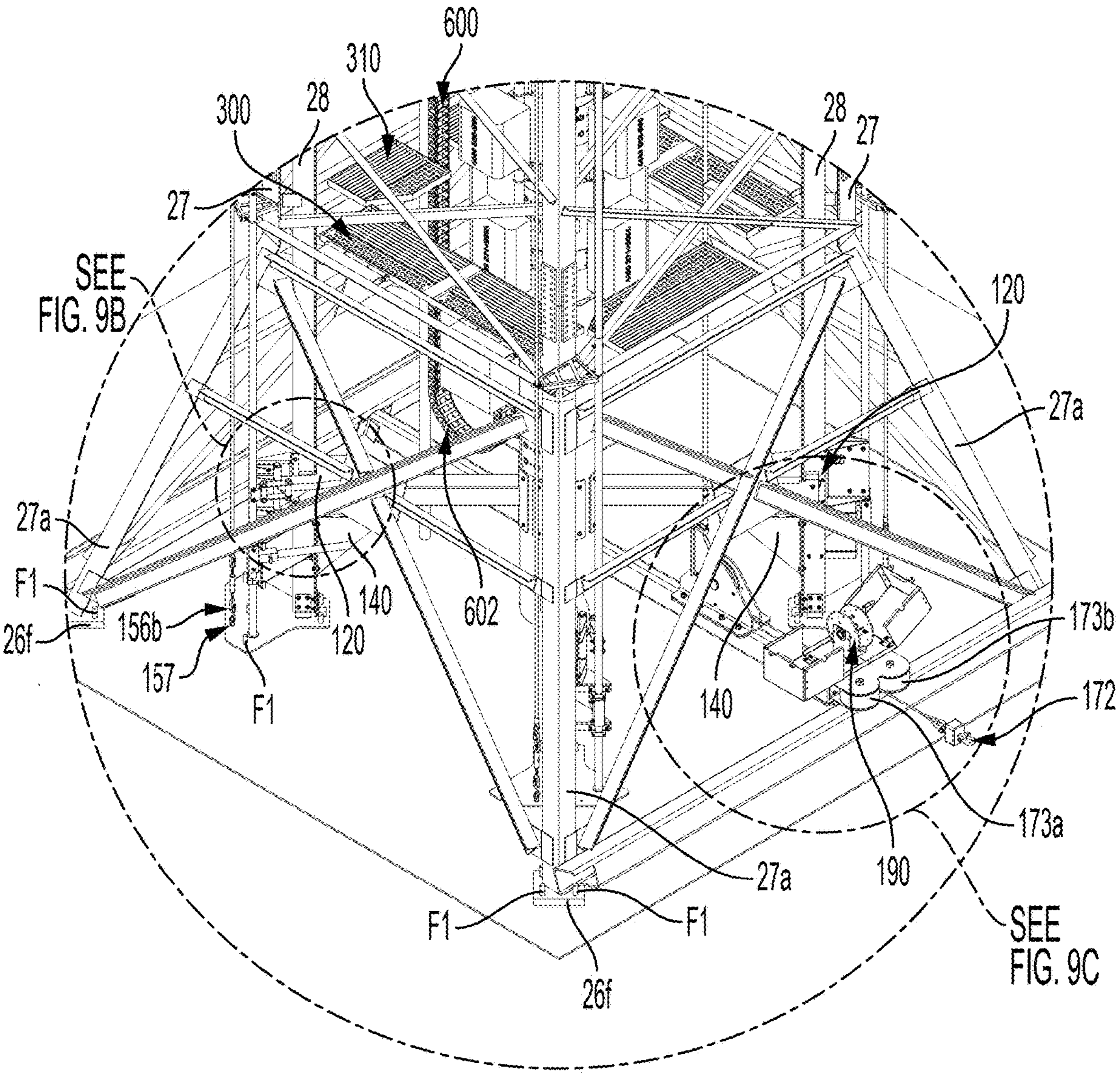
FIG. 9A is an enlarged view of a lower portion of the electrical power transmission tower of FIG. 9 illustrating the mast in the lowered position, the lower latches in the closed position to prevent unwanted upward movement of the mast, and some of the maintenance platforms in the deployed position, according to some embodiments.
Figure 9B:
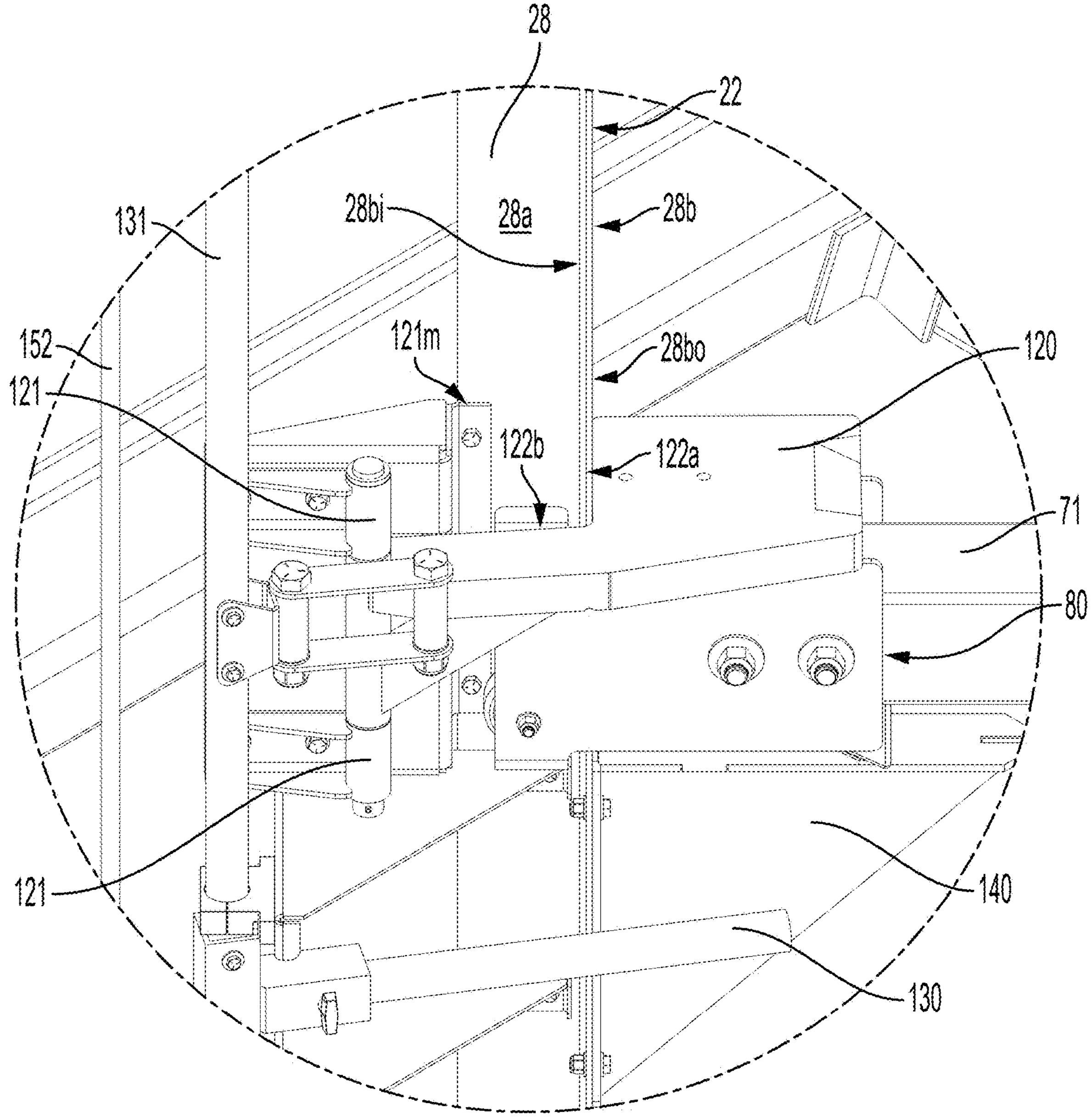
FIG. 9B is an enlarged view of one of the lower latches in FIG. 9A in the closed position.
Figure 9C:
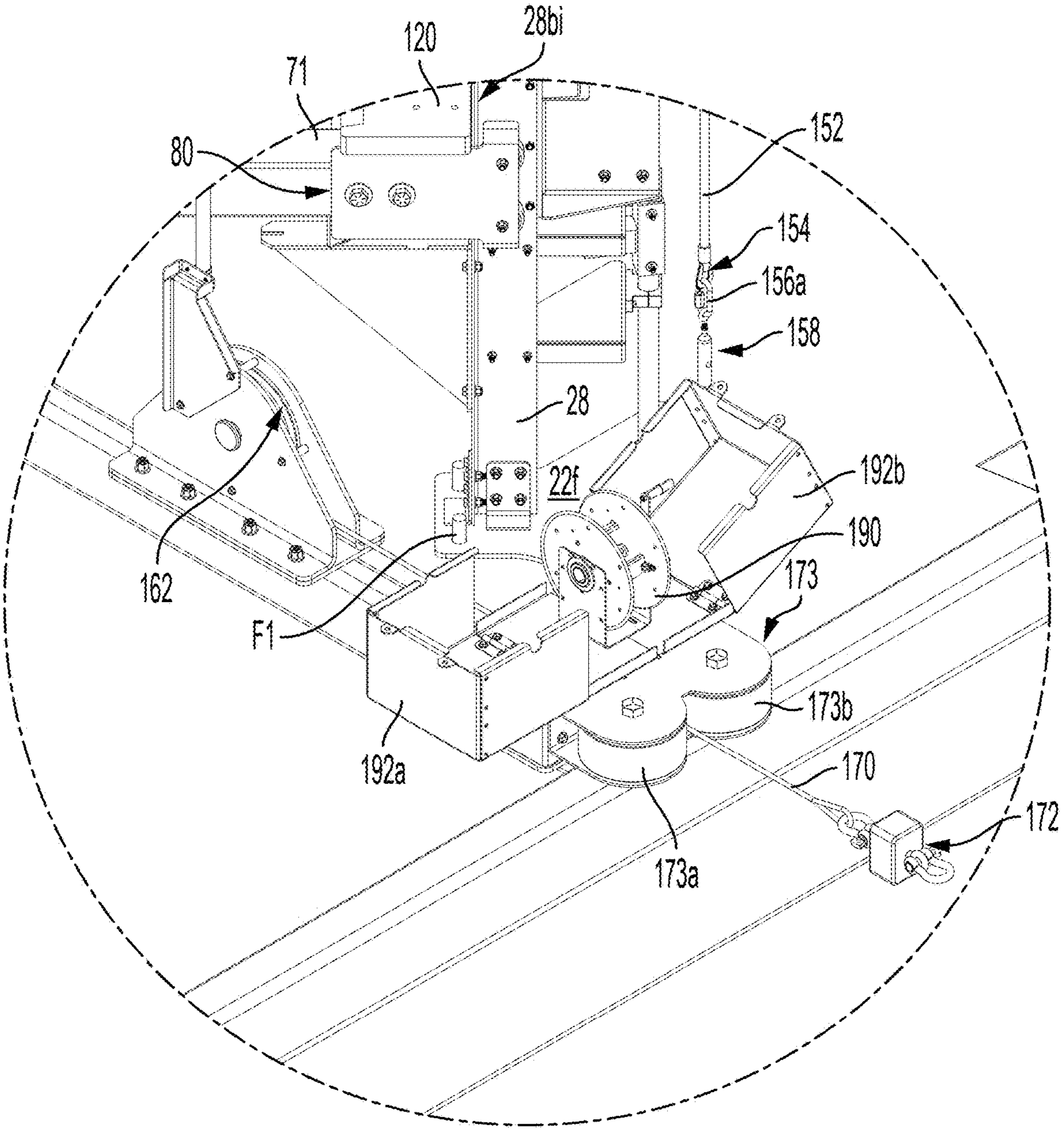
FIG. 9C is an enlarged view of the mast lifting cable and lower pulley assembly for raising and lowering the mast.
Figure 10B:
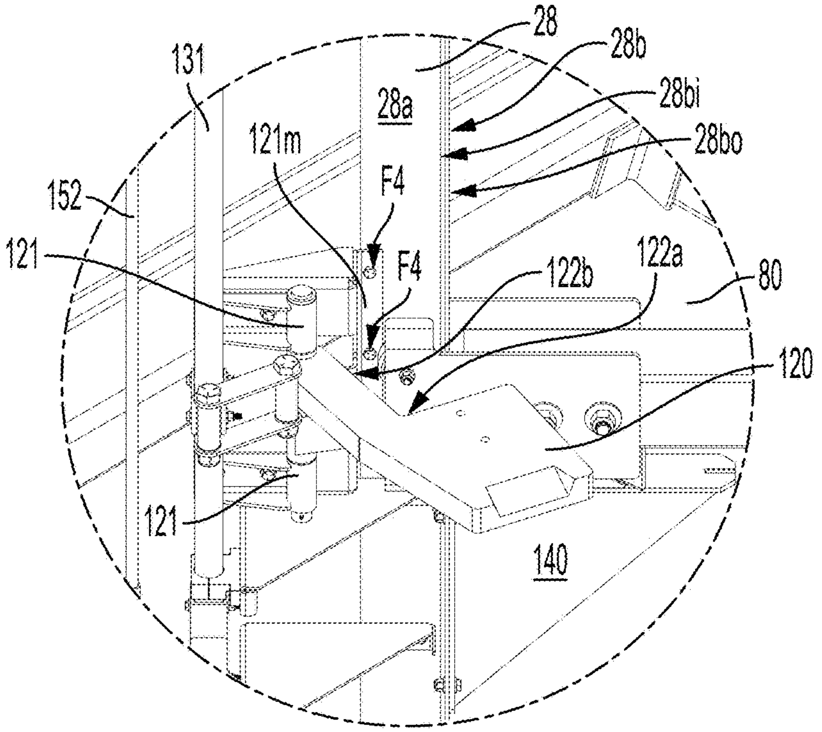
FIG. 10B is an enlarged view of one of the lower latches in FIG. 10A in the open position.
Figure 11A:
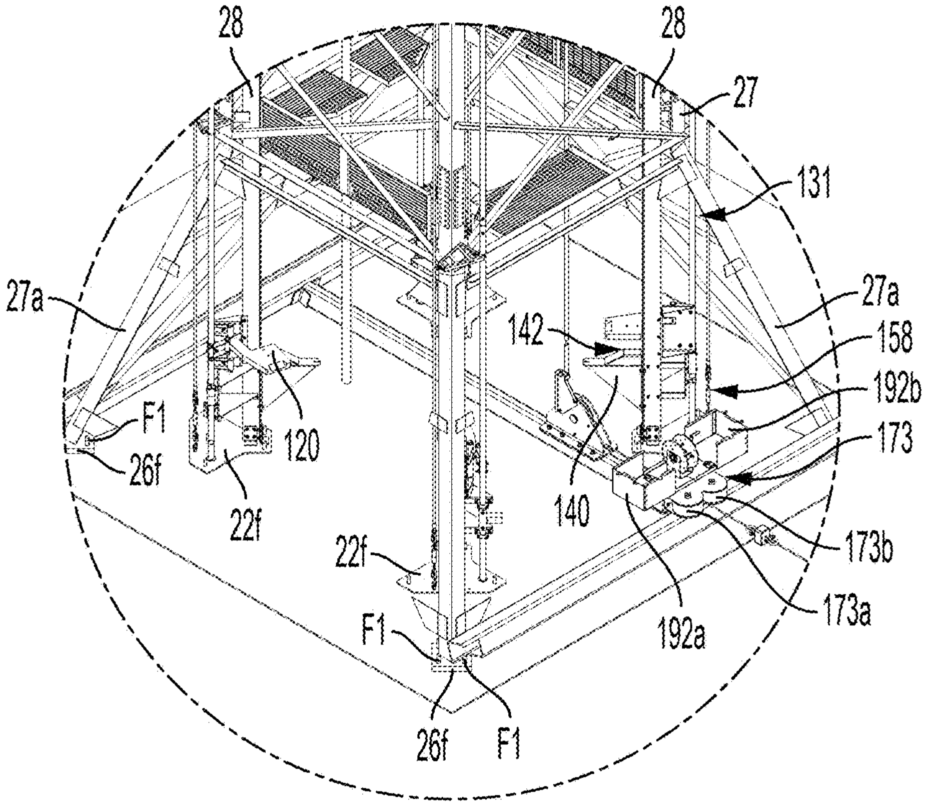
FIG. 11A is an enlarged view of a lower portion of the electrical power transmission tower of FIG. 11 illustrating the lower latches in the open position.

FIGS. 9B, 9C and 11A illustrate the lower latches 120. Each latch 120 is pivotably secured to a respective leg 22 via hinges 121, and is movable between an open position (FIGS. 10B, 11A) and a closed position (FIG. 9B) . When each lower latch 120 is in an open position, the mast 40 can be raised upwardly. When the mast 40 is in the lowered position and each lower latch 120 is in the closed position, each latch 120 is positioned above a respective one of the lower guide arms 71 on the mast 40 and prevents the mast 40 from being raised.

Each upper latch 110 and lower latch 120 may be formed from steel plate and may have a generally "L" shaped configuration that is configured to cooperate with the flange 28*b* of a respective leg second portion 28 and to pivot up to approximately ninety degrees (90°) between open and closed positions. For example, as illustrated in FIG. 11C, each upper latch 110 has an L-shaped plate configuration with generally orthogonal inner edge portions 112*a*, 112*b*. When in the closed position (FIG. 12D), the inner edge portion 112*a* abuts or is positioned closely adjacent to the flange 28*b* of a respective leg second portion 28, and the inner edge portion 112*b* contacts or is positioned closely adjacent to the edge portion of the flange 28*b* and such that the inner edge portion 112*a* and the outer surface 28*bo* of the flange 28*b* of the leg second portion 28 are in general face-to-face arrangement. In addition, each upper latch 110 includes a pedestal 114 that a respective lower guide arm 71 rests upon when the upper latch 110 is in the closed position, as illustrated in FIGS. 11C and 12D. Each pedestal 114 has a shape and size to prevent interference or contact between a respective trolley 80 and the upper latch 110 when the upper latch 110 is in the closed position and supporting a respective lower guide arm 71.

Similarly, each lower latch 120 has an L-shaped plate configuration with generally orthogonal inner edge portions 122*a*, 122*b*. When in the closed position (FIG. 9B), the inner edge portion 122*a* abuts or is positioned closely adjacent to the flange outer surface 28*bo* of a respective leg second portion 28, and the inner edge portion 122*b* contacts or is positioned closely adjacent to the edge portion of the flange 28*b* and such that the inner edge portion 122*b* and the web 28*a* of the leg second portion 28 are in general face-to-face arrangement.

A latch actuator 131 is an elongated rod member that is operably associated with the upper latch 110 and the lower latch 120 of each leg 22, and is configured to be operated manually by a technician standing on the ground via an operating lever 130 (FIGS. 4A, 9B) during raising and lowering operations for the mast 40. The operating lever 130 is used to rotate the latch actuator 131 about its longitudinal axis; one direction of rotation opens the upper and lower latches 110, 120, and the opposite direction of rotation closes the upper and lower latches 110, 120. Rotation of the latch actuator 131 about its longitudinal axis causes pivotal movement of the upper and lower latches 110, 120 about their respective hinges 111, 121. An exemplary actuator mechanism that may be utilized to implement the latch actuator 131 is a "Turner switch". In the illustrated embodiments, the latch actuator 131 is configured to move the upper latch 110 and the lower latch 120 of each leg 22 between the open and closed positions in tandem. However, in other embodiments, the upper latch 110 and the lower latch 120 may be configured to move between the open and closed positions independently (e.g., separate actuators may be utilized for opening and closing the upper latches 110 and the lower latches).

Figure 4:
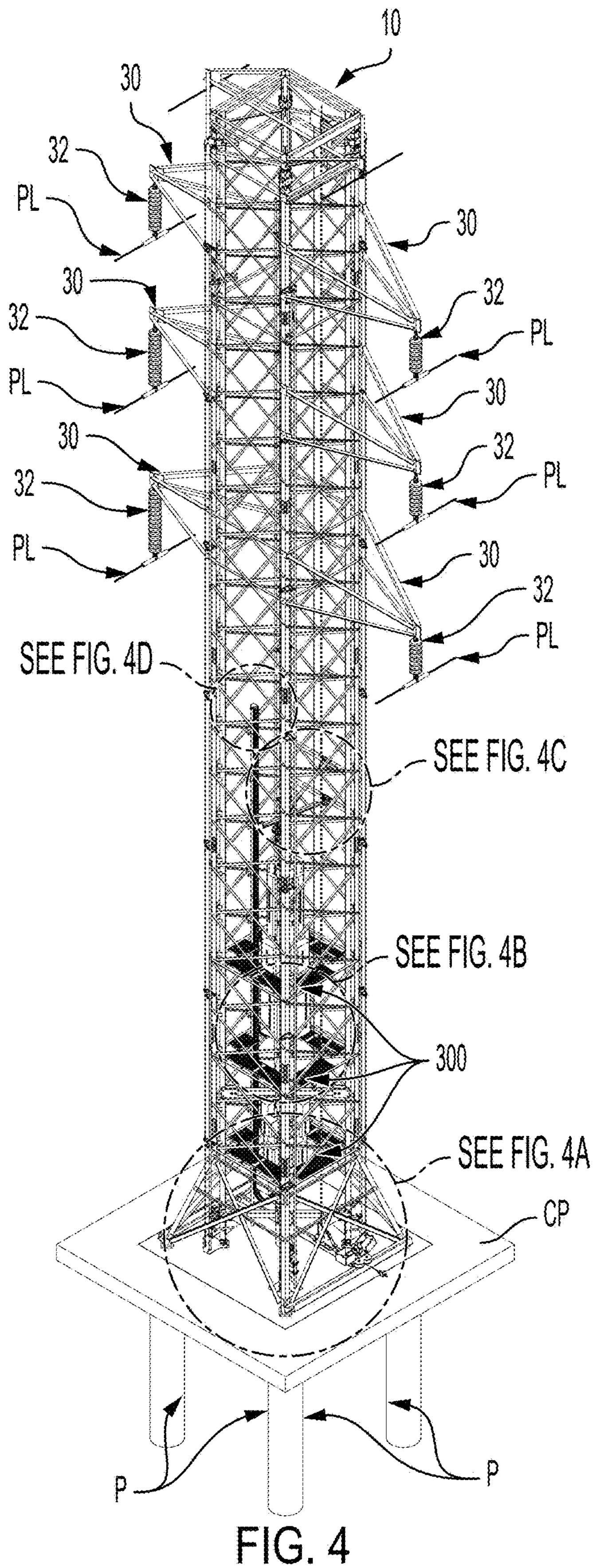
FIG. 4 is a top perspective view of the electrical power transmission tower of FIG. 3 with the mast in the lowered position and the maintenance platforms in a deployed position, according to some embodiments.
Figure 4A:
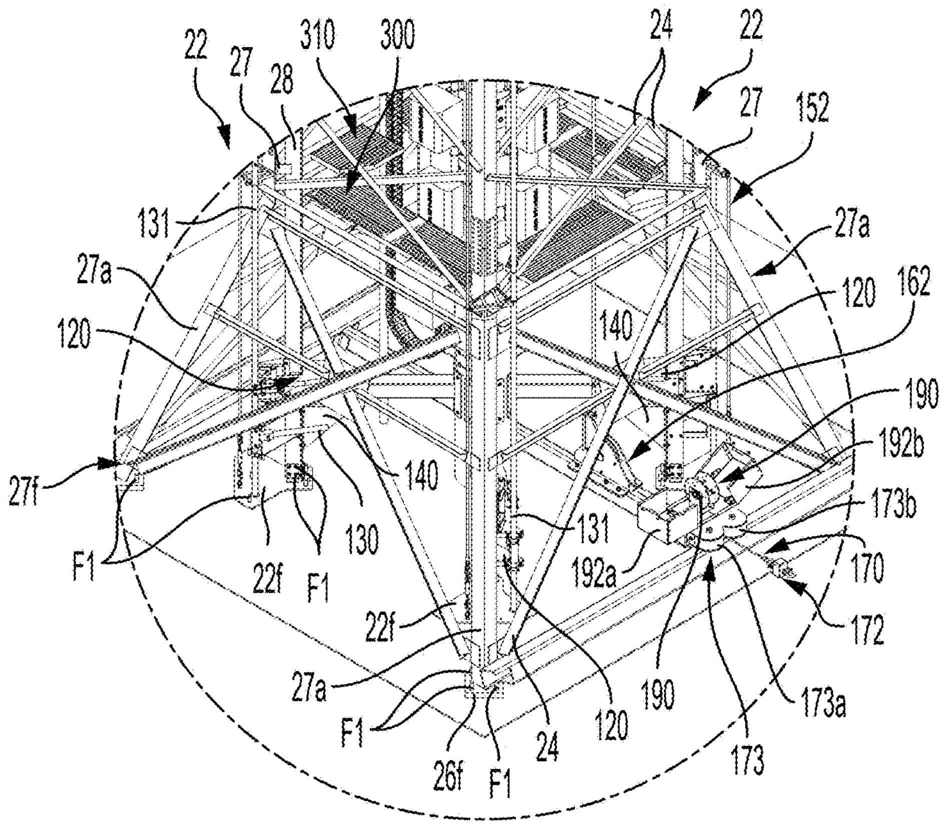
FIG. 4A is an enlarged view of the lower portion of the tower of FIG. 4.

Each leg 22 also includes a mast support saddle 140 (FIGS. 5A, 9A, 9B) extending from a lower portion 22*a* of each leg 22. In the illustrated embodiment, each mast support saddle 140 is secured to the flange 28*b* of a respective leg second portion 28. Each mast support saddle 140 is configured to receive and support a respective lower guide arm 71 when the mast 40 is in the lowered position. FIGS. 4A and 9A illustrate the mast 40 in a lowered position and supported by the mast support saddles 140. Each mast support saddle 140 may be a steel plate or channel that is sized and configured to receive a guide arm 71 thereon. Each mast support saddle 140 may be secured to a respective leg second portion 28 via welding or mechanical fasteners, or via a combination of welding and mechanical fasteners. In addition, mast support saddle 140 includes a pedestal 142 that a respective lower guide arm 71 rests upon when the mast 40 is in the lowered position. Each pedestal 142 has a shape and size to prevent interference or contact between a respective trolley 80 and the mast support saddle 140 when supporting a respective lower guide arm 71.

Each leg 22 also includes a docking clamp 150 (FIGS. 11D, 12E) that is movably secured to the leg upper portion 22*b*. The docking clamps 150 are configured to restrain the mast 40 when the mast 40 is in the raised position by engaging the upper guide arms 70 and preventing unintended vertically upward movement as well as other translational movement of the mast 40. Each of the illustrated docking clamps 150 has an inverted "V" shaped configuration that is configured to Matingly engage with a respective stop member 72 on each of the upper guide arms 70 when the mast 40 is in the raised position, as illustrated in FIGS. 6, 6A and 7. However, embodiments of the present invention are not limited to the illustrated docking clamps 150 and stop members 72. The docking clamps 150 and stop members 72 may have various configurations and shapes so as to matingly engage with each other when the mast 40 is in the raised position.

Each docking clamp 150 may be a steel member that is movably secured to a respective leg 22. Each stop member 72 may be a steel member that is secured to a respective guide arm 70 via welding or mechanical fasteners, or via a combination of welding and mechanical fasteners.

Figure 5:
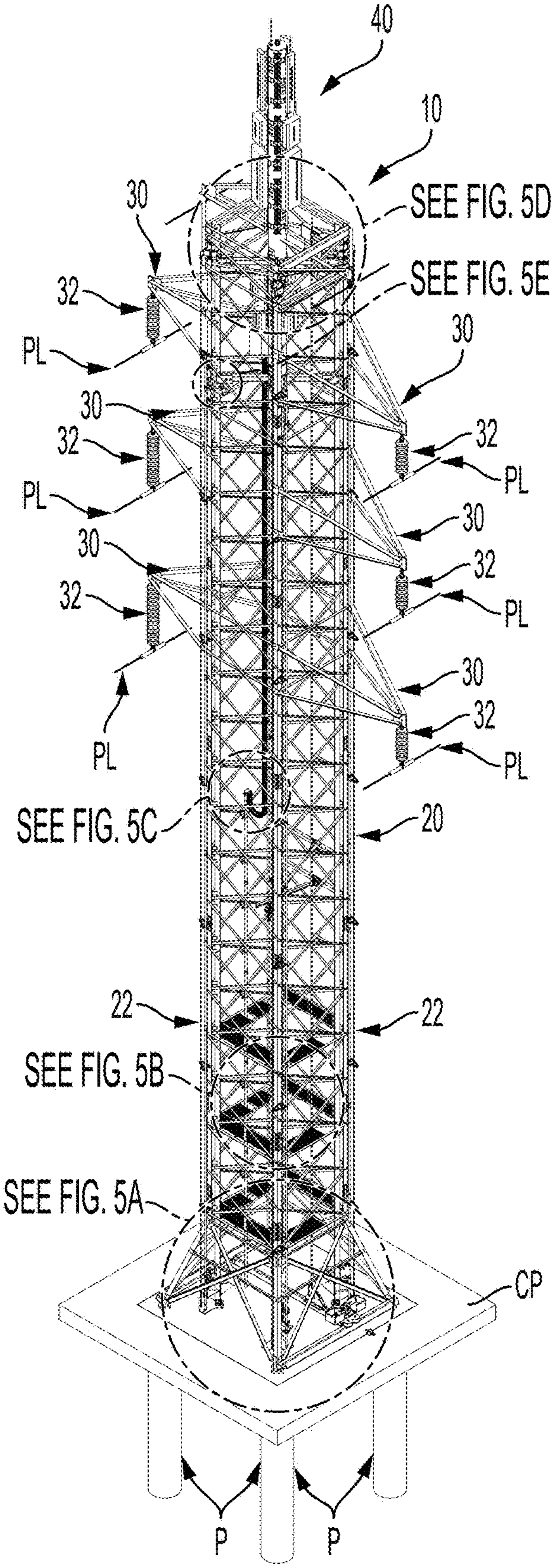
FIG. 5 is a top perspective view of the electrical power transmission tower of FIG. 2 with the mast in the raised position and some of the maintenance platforms in a stowed position, according to some embodiments.
Figure 11B:
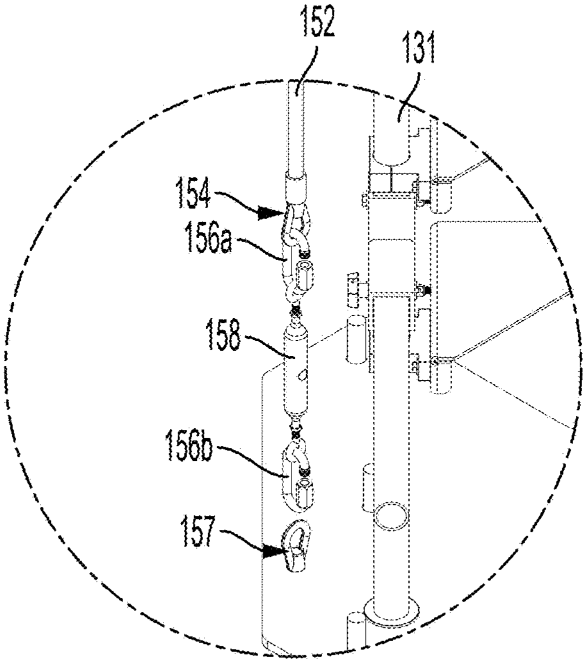
FIG. 11B is an enlarged view of one of the tension binders in a disengaged state, according to some embodiments.

In the illustrated embodiment, each docking clamp 150 is movable up and down on a respective leg 22 by a respective sleeve 151 that matingly engages (e.g., surrounds, etc.) the leg first and second portions 27, 28. An elongate rod 152 (FIGS. 5D, 5E) is utilized to raise and lower each sleeve 151 and docking clamp 150 by a technician standing on the ground. By pushing the rod 152 upward, a respective docking clamp 150 is moved upward, and by pulling the rod 152 downward, the docking clamp 150 is moved downward to engage a stop member 72 of a respective guide arm 70. In addition, as illustrated in FIG. 11B, a lower distal end of each rod 152 includes a ring 154 that is configured to be engaged by a first hook 156*a* of a turnbuckle or tension binder 158. The tension binder 158 includes a second hook 156*b* that is configured to be secured to a hook 157 attached to the flange 22*f* securing each leg second portion 28 to a foundation (e.g., the concrete pad CP, etc.). FIG. 11B illustrates the tension binder 158 prior to engagement with the hook 157 of the flange 22*f*, and FIG. 12C illustrates the tension binder 158 after engagement with the hook 157 of the flange 22*f*. The tension binder 158 is used to pull the rod 152 downward to maintain the rod 152 under tension, thereby restraining the docking clamp 150. The tension binder 158 is rotated axially to provide this force, as would be understood by one of skill in the art of the present invention.

Figure 3:
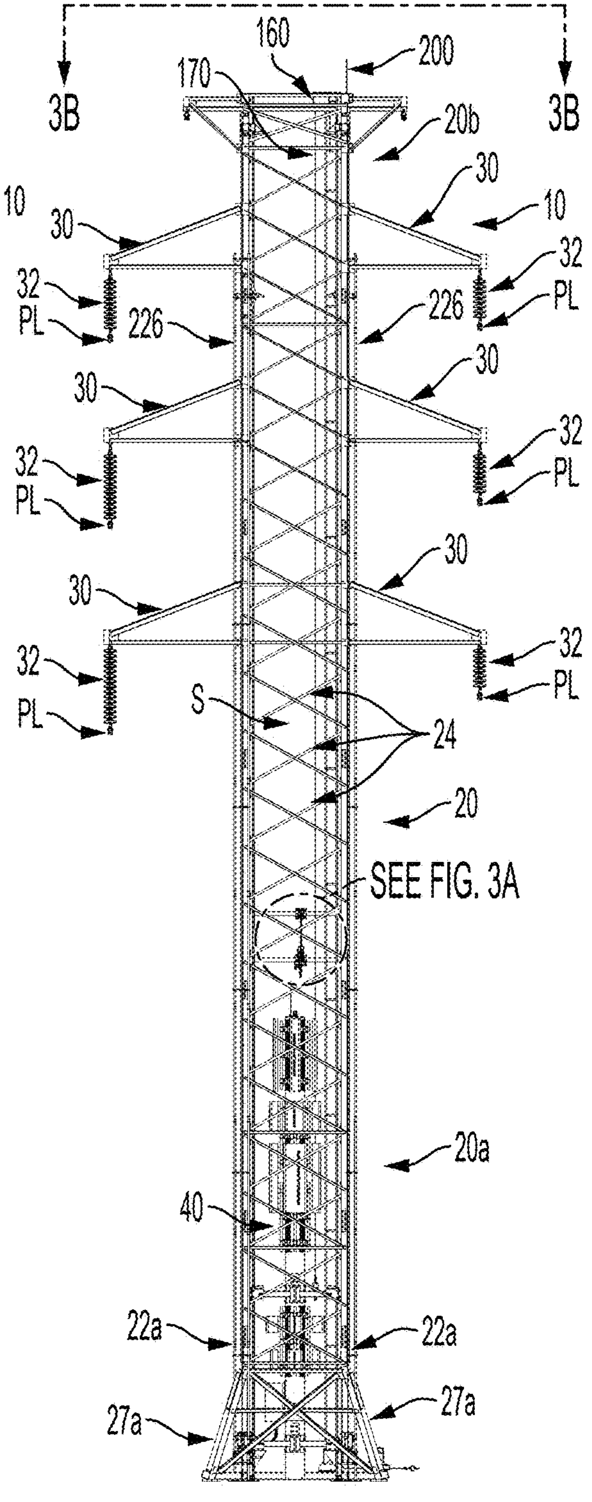
FIG. 3 is a front view of the electrical power transmission tower of FIG. 1 and illustrating the mast in the lowered position.
Figure 5A:
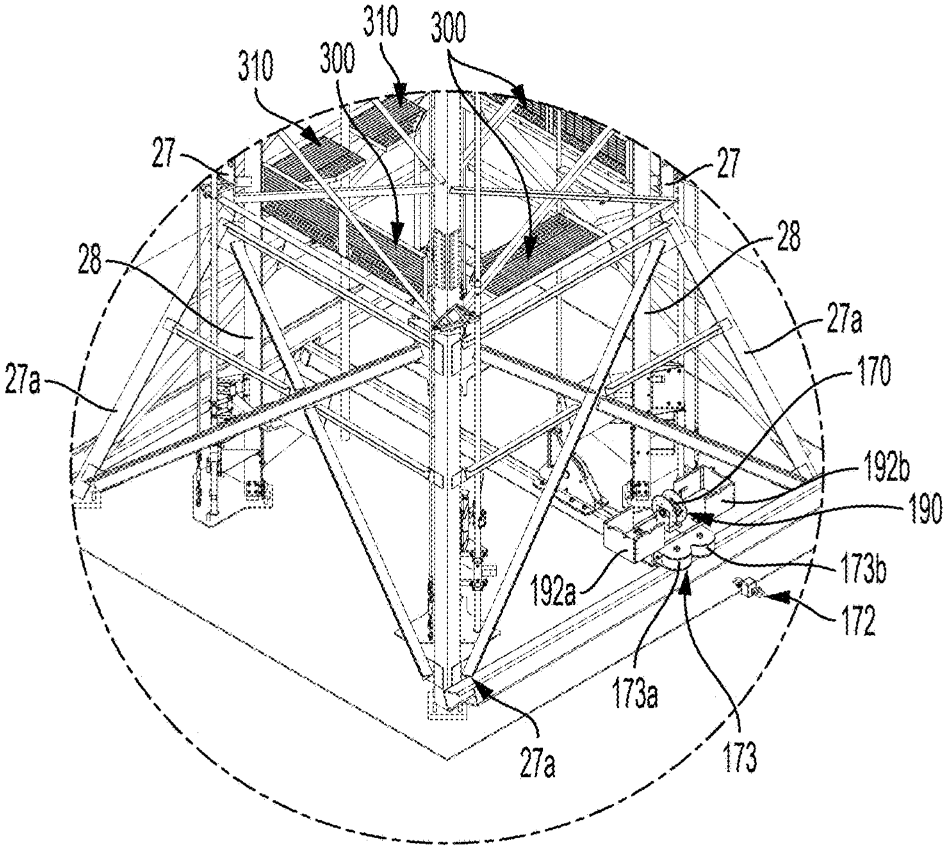
FIG. 5A is an enlarged view of the lower portion of the tower of FIG. 5.

A first sheave or pulley wheel 160 is rotatably mounted to the upper end 20*b* of the lattice structure 20, as illustrated in FIG. 3. A second sheave or pulley wheel 162 is located at the base of the tower 10, as illustrated in FIGS. 4A, 5A, 9A. A lifting cable 170, such as a rope, is threaded over and rides on both pulley wheels 160, 162. One end of the lifting cable 170 is attached to the mast 40 via a lifting lug 42 (FIG. 7) attached to one of the upper guide arms 70, and the other end extends through a roller guide 173 and is configured to be windably received on a spool of a winch system (not shown) during raising and lowering operations of the mast 40. The illustrated roller guide 173 includes adjacent first and second rollers 173*a*, 173*b*. The purpose of the roller guide 173 is to allow various fleet angles of the lifting cable 170 when connected to a winch system. The winch system may not always be directly in front of the pulley wheel 162 and the rollers 173*a*, 173*b* allow for alternate angles of pull.

Figure 2:
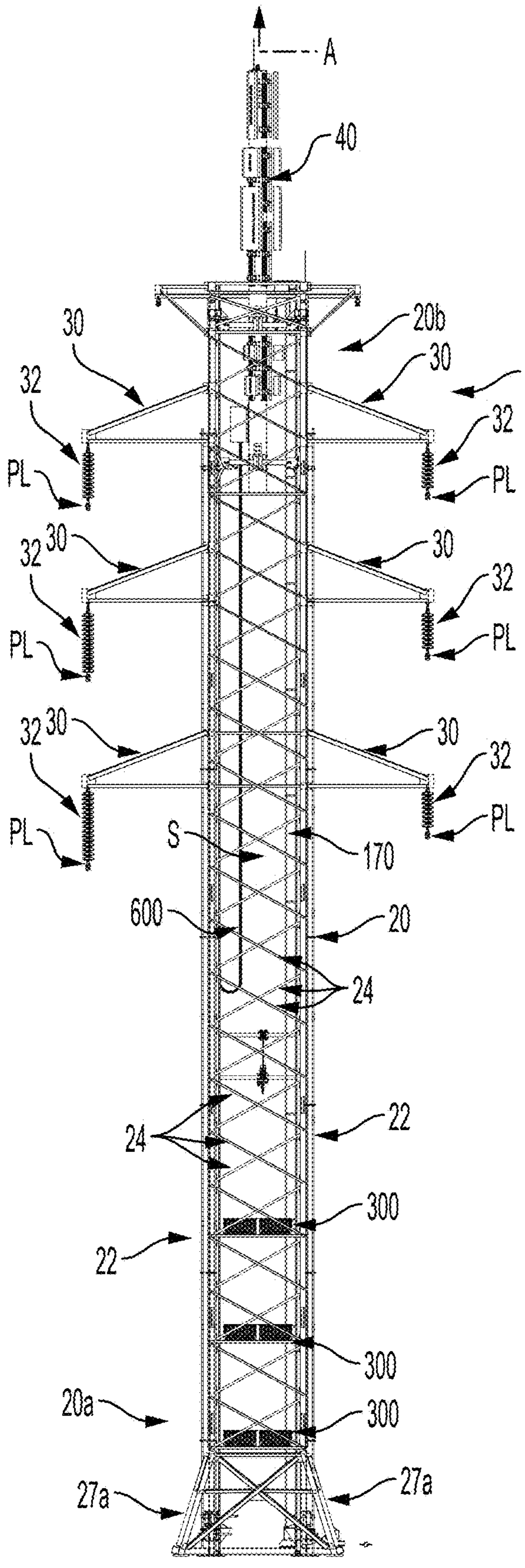
FIG. 2 is a front view of the tower of FIG. 1 and illustrating the mast in the raised position.

Intermediate guides (not illustrated) may also be utilized at various locations on the lattice structure 20 to manage the direction of the lifting cable 170. When the lifting cable 170 is not needed, for example when the mast 40 is in either the raised position or the lowered position, the lifting cable 170 can be wound around a storage spool 190 (FIG. 11A) located at the lower end 20*a* of the lattice structure 20. The lifting cable 170 is not needed when the mast 40 is in the lowered position, as illustrated in FIG. 3, or when the mast 40 is in the raised position and supported by the upper latches 110, as illustrated in FIG. 2. The lifting cable 170 is illustrated being wound around the storage spool 190 in FIGS. 12A and 12B when the mast 40 is in the raised position and supported by the upper latches 110.

In the illustrated embodiment, a pair of movable housing sections 192*a*, 192*b* are configured to enclose the storage spool 190. For example, when the lifting cable 170 is wound around the storage spool, the housing sections 192*a*, 192*b* can be moved to enclose the storage spool 190 and lifting cable and protect the storage spool 190 and the lifting cable 170 from the environment, as well as animals and pests.

In some embodiments, the lifting cable 170 is a non-conductive, high tensile strength rope formed from any of various polymeric materials such as, but not limited to, nylon and polypropylene. In some embodiments, the lifting cable 170 may have a diameter of two and a half inches (2.5"), although other sizes may be utilized. In some embodiments, an end of the lifting cable 170 is operably engaged with a cable tension measuring device 172, such as a dynamometer (FIG. 4A).

Air terminals (i.e., lightning rods) 200 (FIG. 1) may be utilized on both the movable mast 40 and the lattice structure 20 with separate bonding to earth ground. These separate air terminals 200 may be necessary to prevent lightning strike energy from fusing (welding) parts of the mast 40 to parts of the lattice structure 20.

The illustrated tower 10 includes a plurality of vertically spaced apart work platforms 300 movably secured to the lattice structure via hinges (not shown) and upon which technicians can stand in order to access and work on the mast 40 when the mast 40 is in the lowered position. In the illustrated embodiment, there are three sets of work platforms 300 vertically spaced apart. In addition, in the illustrated embodiment, there are various additional work platforms 310 that are adjacent the respective movable work platforms 300 and that are not movable. These work platforms 300, 310 are sized and configured such that they do not interfere with the movement of the mast 40.

Figure 4B:
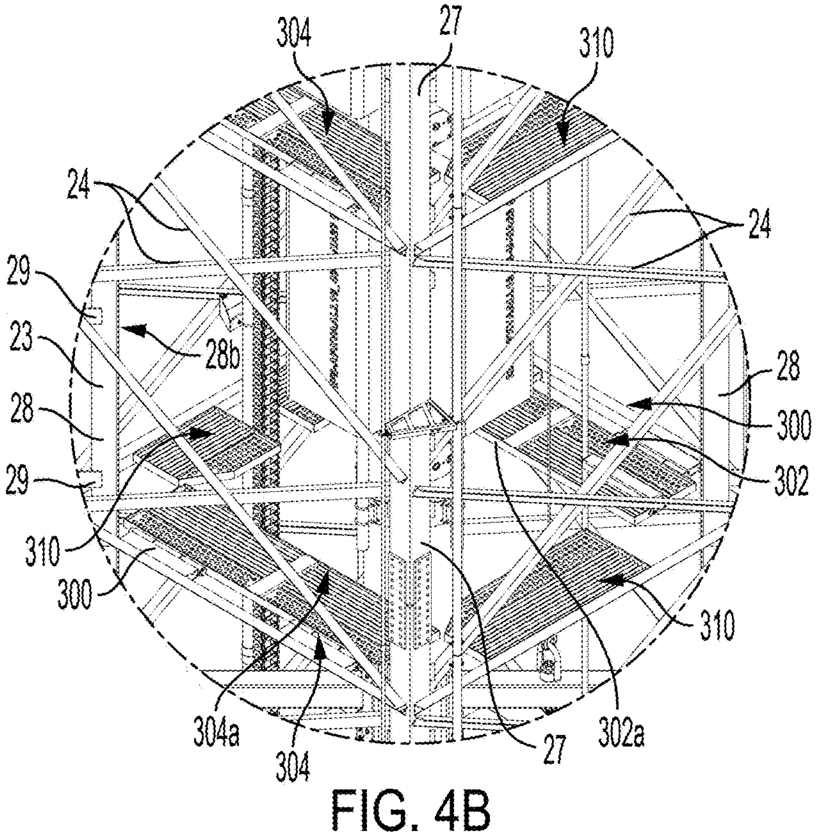
FIG. 4B is an enlarged view of a portion of the electrical power transmission tower of FIG. 4 illustrating some of the work platforms in the deployed position, according to some embodiments.
Figure 5B:
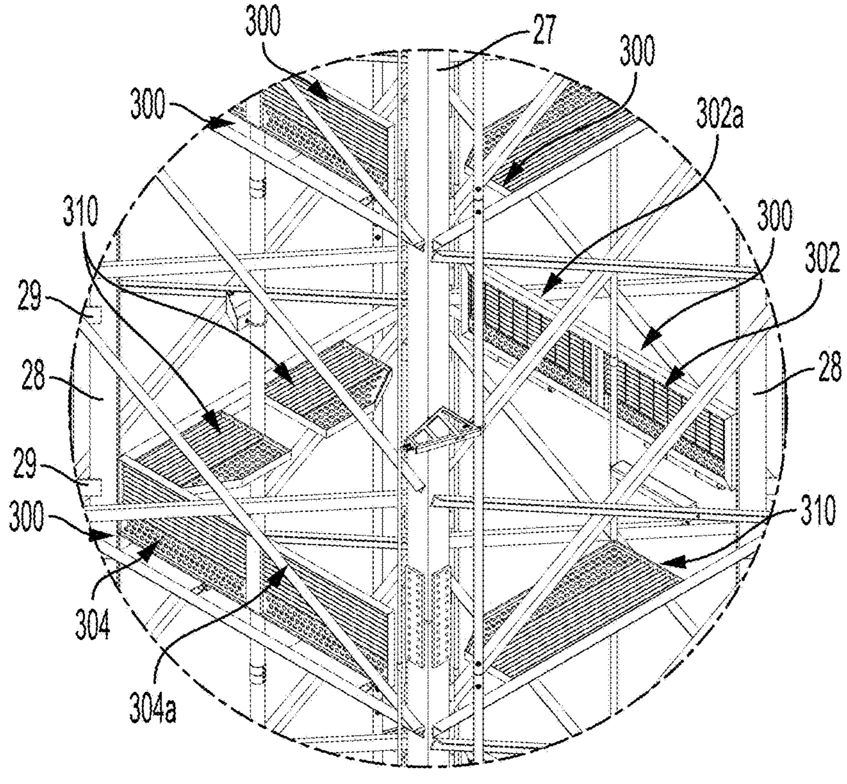
FIG. 5B is an enlarged view of a portion of the electrical power transmission tower of FIG. 5 illustrating some of the work platforms in the stowed position, according to some embodiments.
Figure 5D:
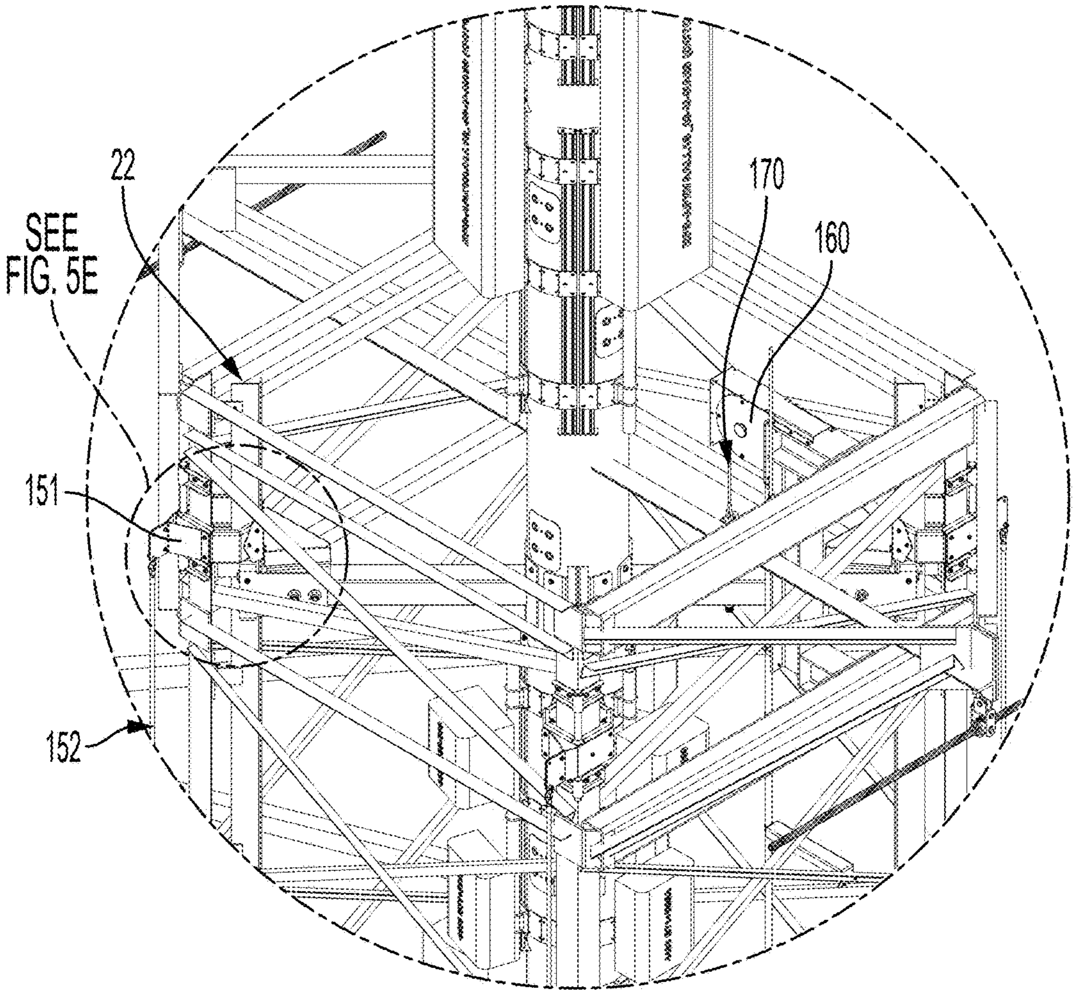
FIG. 5D is an enlarged view of an upper portion of the electrical power transmission tower of FIG. 5.
Figure 5C:
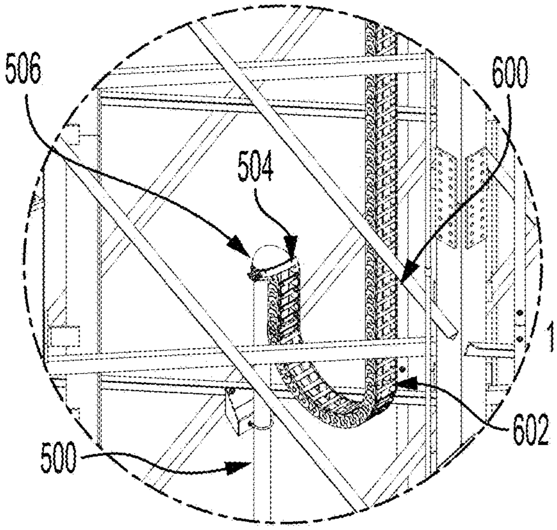
FIG. 5C is an enlarged view of a portion of the electrical power transmission tower of FIG. 5 illustrating an upper portion of the conduit for the electrical cabling, and also illustrating the cabling extending from the conduit upper portion to the mast supported within a flexible cable carrier, according to some embodiments.
Figure 5E:
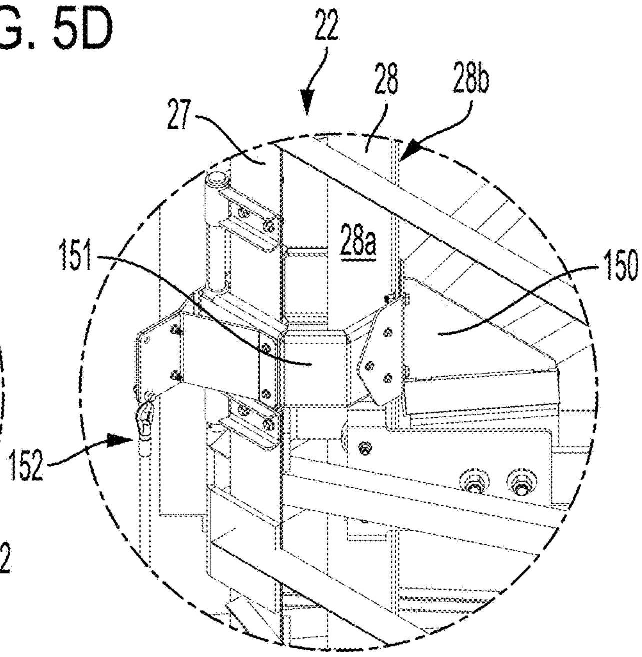
FIG. 5E is an enlarged view of a clamp for restraining the mast from unintended upward movement.

Various levels of work platforms 300, 310, including a single level of work platforms 300, 310, may be utilized in other embodiments. Embodiments of the present invention are not limited to three levels of platforms. Each work platform 300 is pivotable relative to the lattice structure 20 between a use position (FIGS. 4, 4A, 4B) within the internal space S and a stowed position (FIGS. 5, 5A, 5B) within the internal space S. When the work platforms 300 are in the stowed position, the mast 40 can move unimpeded within the internal space S of the tower 10 between the lowered and raised positions.

In the illustrated embodiment, each work platform 300 at each level includes a first section 302 pivotably secured to one side of the lattice structure 20 and a second section 304 pivotably secured to an opposite side of the lattice structure 20. When each work platform 300 is in the use position, the first section 302 and the second section 304 are co-planar and a free edge 302*a* of the first section 302 and a free edge 304*a* of the second section 304 are in adjacent spaced apart relationship such that the mast 40 extends therebetween when the mast 40 in the lowered position.

Figure 3A:
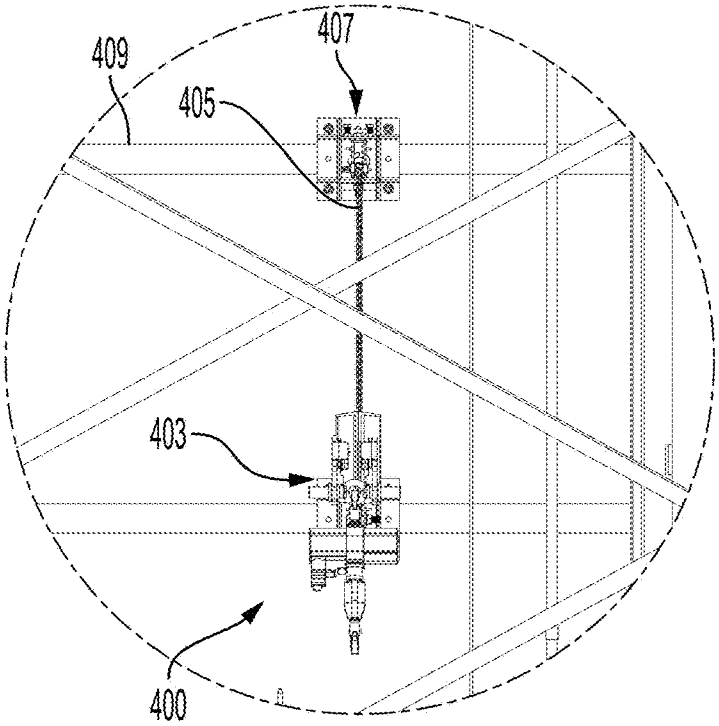
FIG. 3A is an enlarged view of a portion of the electrical power transmission tower of FIG. 1 illustrating a maintenance hoist assembly movably secured to the tower, according to some embodiments.
Figure 3B:
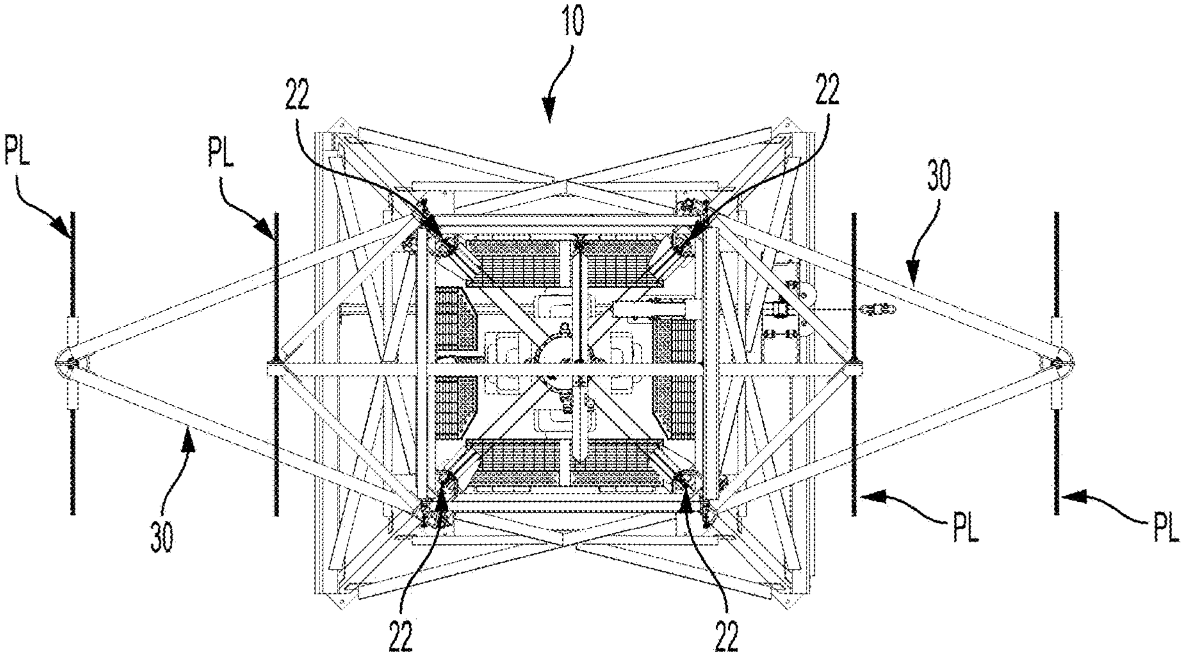
FIG. 3B is a top plan view of the electrical power transmission tower of FIG. 3 taken along line 3B-3B.
Figure 4C:
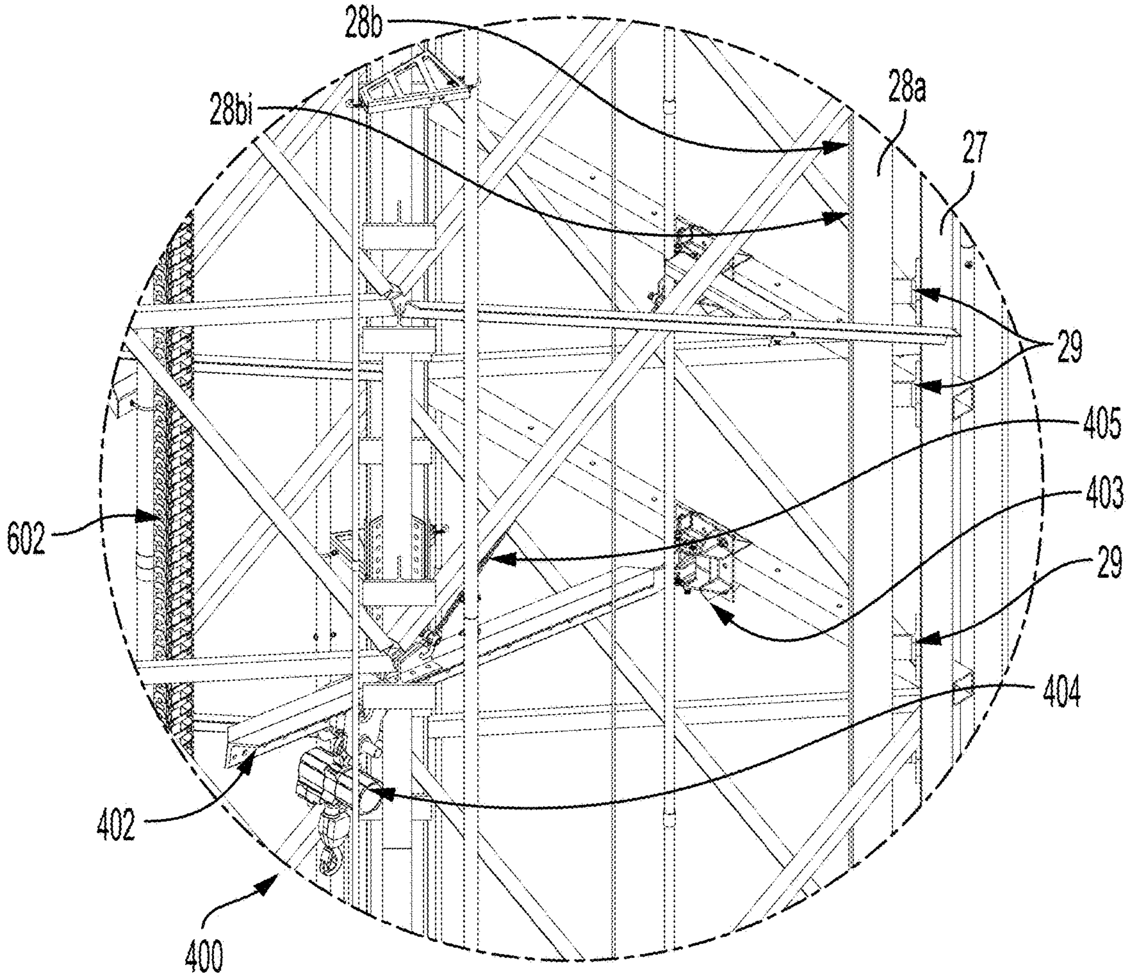
FIG. 4C is an enlarged view of a portion of the electrical power transmission tower of FIG. 4 illustrating the maintenance hoist assembly, according to some embodiments.

In the illustrated embodiment, the tower 10 includes a hoist assembly 400 movably secured to the lattice structure 20 within the internal space S, as illustrated in FIGS. 3A and 4C. The hoist assembly 400 includes a rail 402 that is pivotably secured to the lattice structure 20 via a hinge 403 and is manually movable between a stowed position and an operative position. The rail 402 is supported by a chain 405. The chain 405 is attached to a bracket 407 which is secured to a tubular member 409 of the tower 10, as illustrated. When the hoist assembly 400 is in the stowed position, the mast 40 is not impeded from vertical movement within the internal space S. A hoist 404 is movably secured to the rail 402 and is movable along the rail 402 when the rail 402 is moved into a use position. The hoist 404 may be utilized, for example, to facilitate installation and removal of electronic equipment from the mast 40 when the mast 40 is in the lowered position.

Figure 1A:
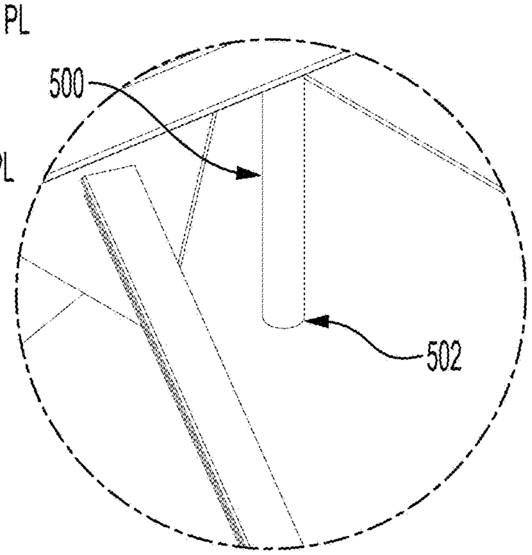
FIG. 1A is an enlarged view of a portion of the electrical power transmission tower of FIG. 1 illustrating a lower portion of a conduit for electrical cabling for equipment supported on the mast, according to some embodiments.
Figure 4D:
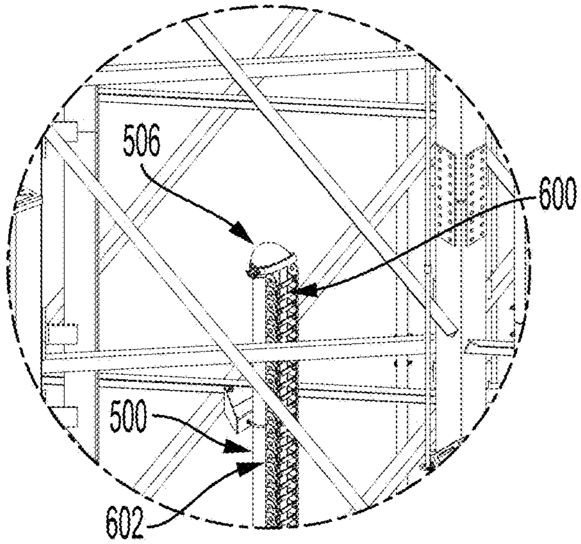
FIG. 4D is an enlarged view of a portion of the electrical power transmission tower of FIG. 4 illustrating an upper portion of the conduit for the electrical cabling, according to some embodiments.

In the illustrated embodiment, the tower 10 includes an elongate hollow conduit 500 secured to the lattice structure 20. The conduit 500 may be formed from metal or plastic and includes an open first end 502 (FIG. 1A) and an opposite open second end 504 (FIG. 4D). The conduit first end 502 is positioned within the internal space S adjacent the lattice structure lower end 20*a*, as illustrated in FIG. 1A. The conduit second end 504 is positioned within the internal space S adjacent an intermediate portion of the lattice structure 20 between the upper end 20*b* and the lower end 20*a*, as illustrated in FIGS. 4 and 4D. In the illustrated embodiment, the conduit second open end 504 includes a weatherhead 506. The weatherhead 506 has a rounded dome shape with a downward facing opening that includes a rubber gasket through which umbilical electrical cabling 600 extends. The downward facing opening of the weatherhead 506 and the rubber gasket are configured to prevent water, dirt and pests from entering the conduit 500.

The umbilical electrical cabling 600 between the conduit second end 504 and the mast 40 is supported within a flexible cable carrier 602. The flexible cable carrier 602 is a hollow structure formed from many links movably joined together and is configured to protect and guide the umbilical electrical cabling 600 as the mast 40 is moved between raised and lowered positions. The cabling 600 may include a combination of fiber optic and electrical cables which connect the various antennas and other equipment on the mast to a telecommunications network. At the base of the tower 10, equipment to which the cabling 600 is connected may be housed in cabinets of other structures.

Movement of the mast 40 from the lowered position to the raised position will now be described. Referring to FIGS. 9 and 9A-9C, the mast 40 is in the lowered position and the guide arms 71 are supported by the support saddles 140. As shown in FIGS. 9A-9C, the lower latches 120 are in the closed position overlying a respective guide arm 71 to prevent inadvertent upward movement of the mast 40.

Figure 10:
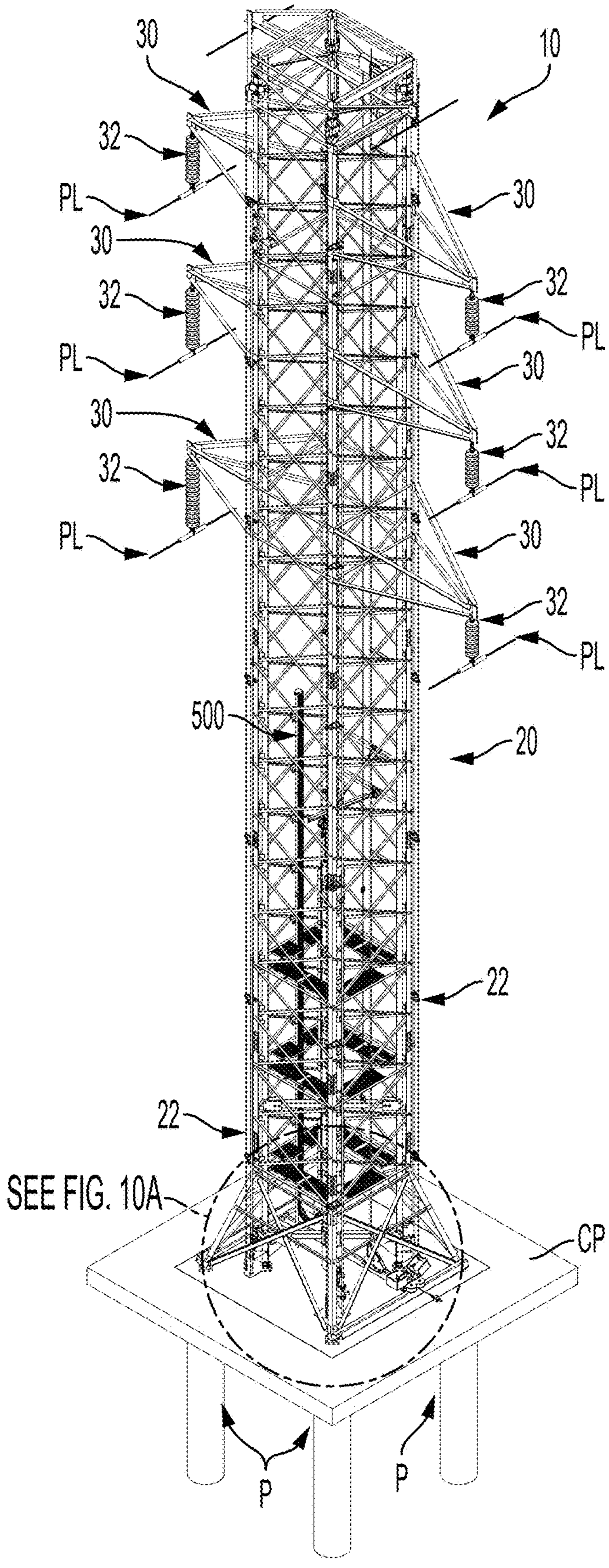
FIG. 10 is a top perspective view of the electrical power transmission tower of FIG. 3 with the mast in the lowered position and some of the maintenance platforms in a stowed position, according to some embodiments.
Figure 10A:
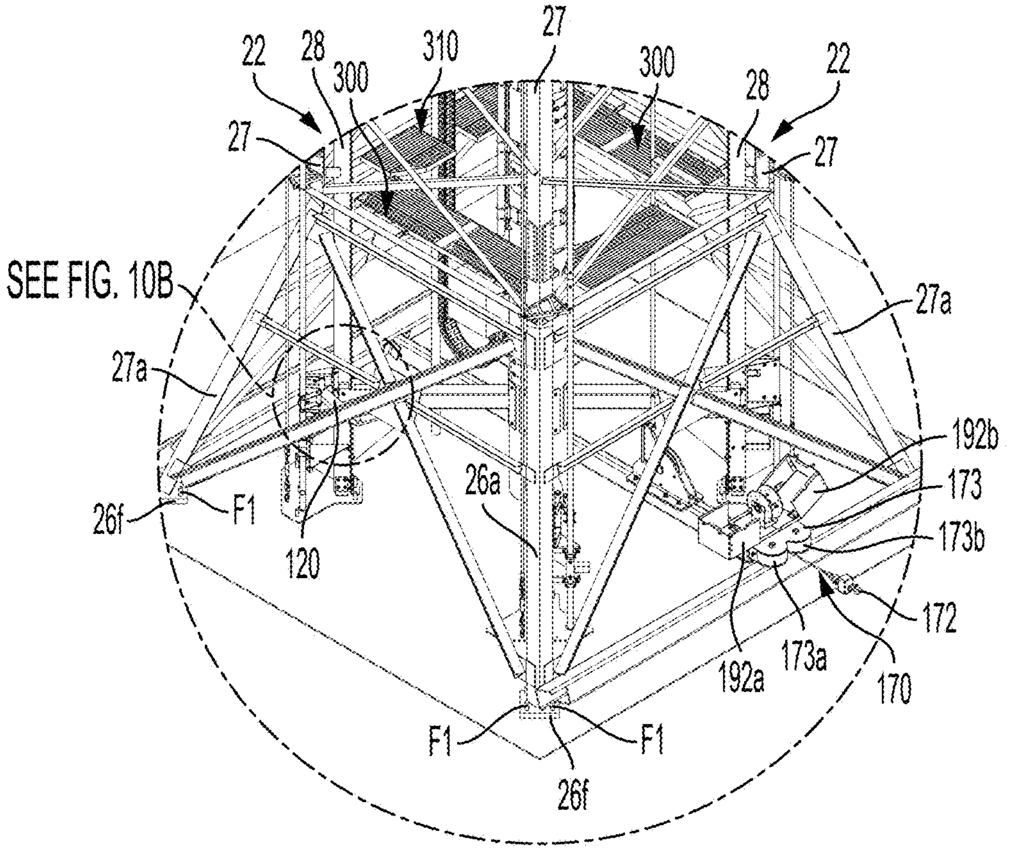
FIG. 10A is an enlarged view of a lower portion of the electrical power transmission tower of FIG. 10 illustrating the lower latches in the open position such that the mast can be moved to the raised position.

To raise the mast 40, the lower latches 120 are pivoted about their respective hinges 121 via actuator rod 131 to an open position, as illustrated in FIGS. 10A and 10B. A dynamometer 172 is then attached to the end of the lifting cable 170 and is connected to a winch line extended from the spool of a winch system (not shown). Such a winch system may be a mobile system provided via a truck or other vehicle. However, in some embodiments of the present invention, the winch system may be located at the site of the tower 10. The other end of the lifting cable 170 remains attached to the mast 40 via the lifting lug 42 (FIG. 6). Operation of the winch system then begins as remote readout of the dynamometer indicates increasing winch line tension. When the dynamometer reading equals the previously determined design force of lifting, i.e., weight of the moving assembly and friction, observation of clearances between legs 22 and companion trolley assemblies 80 will commence. As winch line tension is increased, applying force necessary to fully neutralize the resistance to lifting, mast 40 will be perceptibly separated from all maintenance saddles 140. Winch line tension known via dynamometer readings or other metrics will be maintained as the lifting continues and the mast 40 is slowly raised from the mast support saddles 140. Monitoring of dynamometer readings to remain within safe margins will continue as the mast 40 is raised.

Figure 11D:
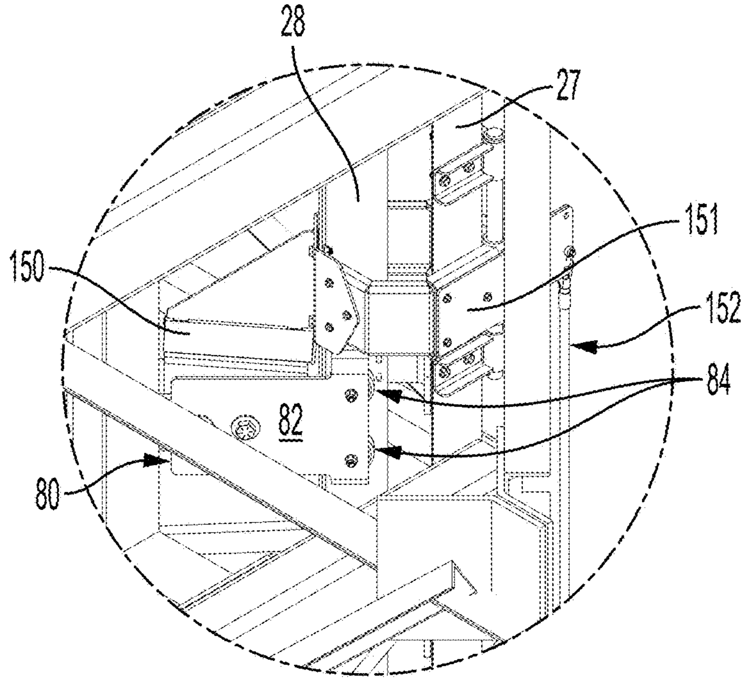
FIG. 11D is an enlarged view of the upper portion of the electrical power transmission tower of FIG. 11 and illustrating one of the docking clamps.
Figure 12E:
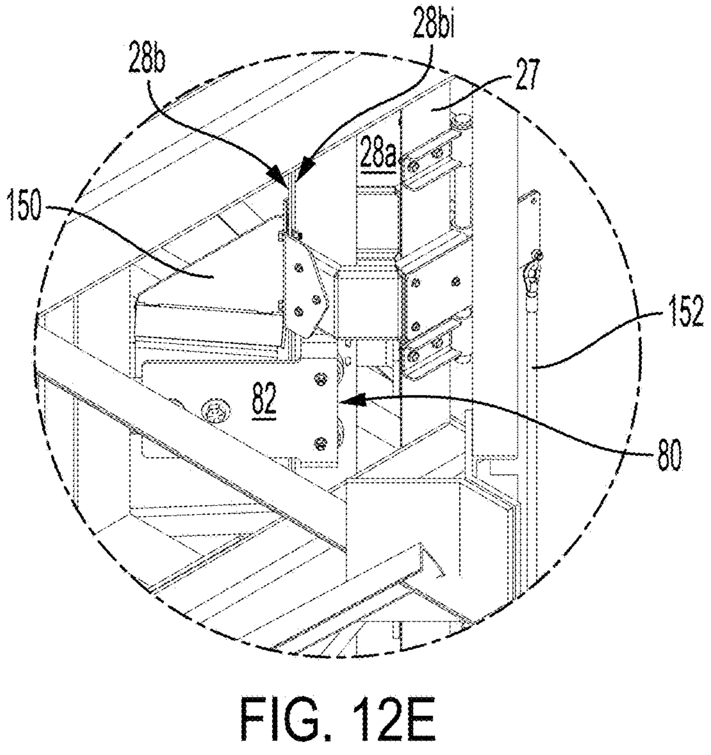
FIG. 12E is an enlarged view of an upper portion of the electrical power transmission tower of FIG. 12 illustrating the docking clamp lowered to engage the guide arm.

Referring to FIGS. 11, 11C and 11D, the mast 40 has been moved to the raised position and the upper latches 110 are in the open position. The docking clamps 150 serve as stops to prevent the mast 40 from being moved too far upwardly. Dynamometer readings will increase and lifting motion will stop when mast 40 contacts docking clamps 150. As shown in FIG. 11C, the mast 40 is raised slightly above the location of each of the upper latches 110 so that each upper latch 110 with its respective pedestal 114 can be pivoted beneath a respective one of the guide arms 71. The upper latches 110 are then pivoted via respective hinges 111 to the closed position, as illustrated in FIG. 12D. The mast 40 is then lowered via the winch system until the guide arms 71 come to rest upon the pedestals 114 on the upper latches 110. The mast 40 is now in the final raised position and the entire weight of the mast 40 is supported by the upper latches 110. The docking clamps 150 are then lowered via actuator rod 152 to engage the guide arms 70 and restrain the mast 40 from movement, as illustrated in FIG. 12E. The end of the lifting cable 170 can be removed from the winch system and then can be wound about the storage spool 190 until needed in the future, as illustrated in FIG. 12A.

To lower the mast 40 from the raised position to the lowered position, the above-described operations are reversed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. An electrical power transmission tower, comprising:

a lattice structure comprising a lower end configured to be anchored to the ground, and an opposite upper end, the lattice structure comprising a plurality of parallel legs joined together in a polygonal cross-section configuration to define an internal space;

at least one support arm extending outwardly from the lattice structure, wherein the at least one support arm is configured to support at least one insulator suspended therefrom, wherein the at least one insulator is configured to support one or more electrical power transmission lines;

a mast movable within the internal space of the lattice structure along a vertical axis thereof between a lowered position and a raised position, wherein the mast is configured to support electronic equipment;

a plurality of guide arms extending outward from the mast, wherein each guide arm is movably engaged with a respective one of the legs such that the guide arms are movable along the legs as the mast is moved between the lowered position and the raised position; and at least one work platform movably secured to the lattice structure, wherein the at least one work platform is pivotable relative to the lattice structure between a use position within the internal space and a stored position within the internal space, wherein the stored position allows the mast to move unimpeded within the internal space between the lowered and raised positions.

2. The electrical power transmission tower of claim 1, wherein each leg comprises a first elongate portion and a second elongate portion connected to the first elongate portion in adjacent spaced apart relationship, wherein the first elongate portion is an angle member and the second elongate portion is a WT beam.

3. The electrical power transmission tower of claim 1, wherein one or more of the following are supported by the mast: a cellular antenna array, a remote radio unit (RRU) array, a microwave antenna, imaging equipment, an acoustic sensor, a tectonic or motion sensor, a thermal sensor, a chemical sensor, a nuclear sensor.

4. The electrical power transmission tower of claim 1, wherein the at least one work platform comprises a first section pivotably secured to one side of the lattice structure and a second section pivotably secured to an opposite side of the lattice structure, wherein, when the at least one work platform is in the use position, the first section and the second section are co-planar and a free edge of the first section and a free edge of the second section are in adjacent spaced apart relationship such that the mast extends therebetween when in the lowered position.

5. The electrical power transmission tower of claim 1, wherein the plurality of guide arms comprise a plurality of upper guide arms and a plurality of lower guide arms longitudinally spaced apart from the plurality of upper guide arms, wherein each leg comprises a docking clamp movably secured thereto, and wherein each docking clamp is configured to engage a respective one of the upper guide arms and restrain the mast when the mast is in the raised position.

6. The electrical power transmission tower of claim 5, further comprising a connecting rod secured to each docking clamp, and a tension binder secured to the ground, wherein the tension binder is configured to removably engage the connecting rod and restrain the docking clamp from movement when the mast is in the raised position.

7. The electrical power transmission tower of claim 1, wherein each leg comprises:

an upper end portion and a lower end portion;

an upper latch movably secured to the leg upper end portion and a lower latch movably secured to the leg lower end portion, wherein the upper latch and the lower latch are movable between open and closed positions, wherein the upper latch is configured to support the mast when the mast is in the raised position; and a latch actuator operably associated with the upper latch and the lower latch, wherein the latch actuator is configured to move the upper latch and the lower latch between the open and closed positions.

8. The electrical power transmission tower of claim 7, wherein the upper latch comprises a pedestal that is configured to engage a respective guide arm when the upper latch is in the closed position.

9. The electrical power transmission tower of claim 1, further comprising a hoist assembly movably secured to the lattice structure within the internal space, wherein the hoist assembly is movable between a stowed position and an operative position, wherein the hoist assembly is configured to facilitate installation and removal of the electronic equipment from the mast when the mast is in the lowered position.

10. The electrical power transmission tower of claim 1, further comprising:

an elongate hollow conduit secured to the lattice structure, wherein the conduit comprises an open first end and an opposite open second end, wherein the conduit first end is positioned within the internal space adjacent the lattice structure lower end and the conduit second end is positioned within the internal space adjacent an intermediate portion of the lattice structure between the upper end and the lower end; and electrical cabling extending through the conduit and connected to electrical equipment on the mast, wherein the electrical cabling between the conduit second end and the mast is supported within a flexible cable carrier.

11. An electrical power transmission tower, comprising:

a lattice structure comprising a lower end configured to be anchored to the ground, and an opposite upper end, the lattice structure comprising four parallel legs joined together in a quadrilateral cross-section configuration to define an internal space;

at least one support arm extending outwardly from the lattice structure;

at least one insulator suspended from the at least one support arm, the at least one insulator configured to support one or more electrical power transmission lines;

a mast movable within the internal space of the lattice structure along a vertical axis thereof between a lowered position and a raised position, wherein the mast is configured to support electronic equipment;

a plurality of guide arms extending outward from the mast, wherein each guide arm is movably engaged with a respective one of the legs such that the guide arms are movable along the legs as the mast is moved between the lowered position and the raised position;

an elongate hollow conduit secured to the lattice structure, wherein the conduit comprises an open first end and an opposite open second end, wherein the conduit first end is positioned within the internal space adjacent the lattice structure lower end and the conduit second end is positioned within the internal space adjacent an intermediate portion of the lattice structure between the upper end and the lower end; and electrical cabling extending through the conduit and connected to an electrical cabinet on the mast, wherein the electrical cabling between the conduit second end and the mast is supported within a flexible cable carrier.

12. The electrical power transmission tower of claim 11, wherein each guide arm comprises a trolley in rolling engagement with a respective one of the legs.

13. The electrical power transmission tower of claim 11, wherein each leg comprises a first elongate portion and a second elongate portion connected to the first elongate portion in adjacent spaced apart relationship, wherein the second elongate portion is a flanged beam, and wherein each trolley comprises two pairs of wheels, the wheels of each pair straddling opposing sides of the flanged beam.

14. The electrical power transmission tower of claim 11, further comprising at least one work platform movably secured to the lattice structure, wherein the at least one work platform is pivotable relative to the lattice structure between a use position within the internal space, in which the at least one work platform is generally perpendicular to the vertical axis, and a stored position within the internal space that allows the mast to move unimpeded within the internal space between the lowered and raised positions.

15. The electrical power transmission tower of claim 14, wherein the at least one work platform comprises a first section pivotably secured to one side of the lattice structure and a second section pivotably secured to an opposite side of the lattice structure, wherein, when the at least one work platform is in the use position, the first section and the second section are co-planar and a free edge of the first section and a free edge of the second section are in adjacent spaced apart relationship such that the mast extends therebetween when in the lowered position.

16. The electrical power transmission tower of claim 11, wherein the plurality of guide arms comprise a plurality of upper guide arms and a plurality of lower guide arms longitudinally spaced apart from the plurality of upper guide arms.

17. The electrical power transmission tower of claim 16, wherein each of the plurality of upper guide arms comprises a trolley in rolling engagement with a respective one of the legs, wherein at least one of the plurality of upper guide arms comprises a stop member extending outward from an upper surface thereof, and wherein the stop member has a height relative to the upper surface that is greater than a height of the trolley relative to the upper surface.

18. The electrical power transmission tower of claim 17, wherein the stop member is angled relative to the upper surface such that an end of the stop member adjacent the trolley is lower that an opposite end of the stop member.

19. The electrical power transmission tower of claim 16, wherein each leg comprises a docking clamp movably secured thereto, wherein each docking clamp is configured to engage a respective one of the upper guide arms and restrain the mast from upward movement when the mast is in the raised position.

20. The electrical power transmission tower of claim 19, further comprising a connecting rod secured to each docking clamp, and a tension binder secured to the lattice structure, wherein the tension binder is configured to removably engage the connecting rod and restrain the docking clamp from movement when the mast is in the raised position.

21. The electrical power transmission tower of claim 11, wherein each leg comprises:

an upper end portion and a lower end portion;

an upper latch movably secured to the leg upper end portion and a lower latch movably secured to the leg lower end portion, wherein the upper latch and the lower latch are movable between open and closed positions, wherein the upper latch is configured to support the mast when the mast is in the raised position, wherein the upper latch comprises a pedestal that is configured to engage a respective guide arm when the upper latch is in the closed position;

a latch actuator operably associated with the upper latch and the lower latch, wherein the latch actuator is configured to move the upper latch and the lower latch between the open and closed positions; and a mast support saddle configured to support the mast when the mast is in the lowered position.

22. The electrical power transmission tower of claim 21, wherein the latch actuator is configured to move the upper latch and the lower latch between the open and closed positions in tandem.

23. The electrical power transmission tower of claim 11, wherein the lattice structure upper end comprises a pulley wheel rotatably mounted thereto, and further comprising a lifting cable attached at one end to the mast, wherein the lifting cable is threaded over and rides on the pulley wheel, and wherein the lifting cable is configured to be windably received at an opposite end on a spool of a winch system.

24. The electrical power transmission tower of claim 11, further comprising a hoist assembly movably secured to the lattice structure within the internal space, wherein the hoist assembly is movable between a stowed position and an operative position, wherein the hoist assembly is configured to facilitate installation and removal of the electronic equipment from the mast when the mast is in the lowered position.

25. An electrical power transmission tower, comprising:

a lattice structure comprising a lower end configured to be anchored to the ground, and an opposite upper end, the lattice structure comprising four parallel legs joined together in a quadrilateral cross-section configuration to define an internal space;

at least one support arm extending outwardly from the lattice structure;

at least one insulator suspended from the at least one support arm, the at least one insulator configured to support one or more electrical power transmission lines;

a mast movable within the internal space of the lattice structure along a vertical axis thereof between a lowered position and a raised position, wherein the mast supports one or more of the following: a cellular antenna array, a remote radio unit (RRU) array, a microwave antenna, imaging equipment, an acoustic sensor, a tectonic or motion sensor, a thermal sensor, a chemical sensor, a nuclear sensor;

a plurality of guide arms extending outward from the mast, wherein each guide arm is movably engaged with a respective one of the legs such that the guide arms are movable along the legs as the mast is moved between the lowered position and the raised position;

at least one work platform movably secured to the lattice structure, wherein the at least one work platform is pivotable relative to the lattice structure between a use position within the internal space and a stored position within the internal space, wherein the stored position allows the mast to move unimpeded within the internal space between the lowered and raised positions; and wherein each leg comprises a mast support saddle configured to support the mast when the mast is in the lowered position.

26. The electrical power transmission tower of claim 25, wherein the at least one work platform comprises a first section pivotably secured to one side of the lattice structure and a second section pivotably secured to an opposite side of the lattice structure, wherein, when the at least one work platform is in the use position, the first section and the second section are co-planar and a free edge of the first section and a free edge of the second section are in adjacent spaced apart relationship such that the mast extends therebetween when in the lowered position.

27. The electrical power transmission tower of claim 25, wherein the plurality of guide arms comprise a plurality of upper guide arms and a plurality of lower guide arms longitudinally spaced apart from the plurality of upper guide arms, wherein each leg comprises a docking clamp movably secured thereto, and wherein each docking clamp is configured to engage a respective one of the upper guide arms and restrain the mast when the mast is in the raised position.

28. The electrical power transmission tower of claim 27, further comprising a connecting rod secured to each docking clamp, and a tension binder secured to the lattice structure, wherein the tension binder is configured to removably engage the connecting rod and restrain the docking clamp from movement when the mast is in the raised position.

29. The electrical power transmission tower of claim 25, wherein each leg comprises:

an upper end portion and a lower end portion;

an upper latch movably secured to the leg upper end portion and a lower latch movably secured to the leg lower end portion, wherein the upper latch and the lower latch are movable between open and closed positions, wherein the upper latch is configured to support the mast when the mast is in the raised position and comprises a pedestal that is configured to engage a respective guide arm when the upper latch is in the closed position; and a latch actuator operably associated with the upper latch and the lower latch, wherein the latch actuator is configured to move the upper latch and the lower latch between the open and closed positions.

30. The electrical power transmission tower of claim 25, further comprising a hoist assembly movably secured to the lattice structure within the internal space, wherein the hoist assembly is movable between a stowed position and an operative position, wherein the hoist assembly is configured to facilitate installation and removal of the electronic equipment from the mast when the mast is in the lowered position.

31. The electrical power transmission tower of claim 25, wherein each leg comprises a first elongate portion and a second elongate portion connected to the first elongate portion in adjacent spaced apart relationship, wherein the second elongate portion is a flanged beam.

32. A mast for an electrical power transmission tower, the mast comprising:

an elongate tubular member configured to support electronic equipment in multiple longitudinally spaced apart locations, wherein the tubular member comprises an elongate upper portion defining a first longitudinal axis, and an elongate lower portion defining a second longitudinal axis, wherein the lower portion is removably secured to the upper portion such that the first longitudinal axis and the second longitudinal axis are colinear; and a plurality of arms extending outwardly from a portion of the tubular member in circumferentially spaced apart relationship, wherein a free end of each arm comprises a trolley having a plurality of wheels, and wherein the trolley is configured to be in rolling engagement with the tower so that the mast is movable within an internal space of the tower between a lowered position and a raised position.

33. The mast of claim 32, wherein the lower portion is removably secured to the upper portion via a connecting portion.

34. The mast of claim 32, wherein at least one of the plurality of arms comprises a stop member extending outward from an upper surface thereof, wherein the stop member has a height relative to the upper surface that is greater than a height of the trolley relative to the upper surface.

35. The mast of claim 34, wherein the stop member is angled relative to the upper surface such that an end of the stop member adjacent the trolley is lower that an opposite end of the stop member.

36. The mast of claim 32, wherein the plurality of arms comprises a plurality of upper arms and a plurality of lower arms longitudinally spaced apart from the plurality of upper arms.

37. The mast of claim 32, wherein each of the plurality of arms comprises a proximal end opposite the free end, and wherein the proximal end comprises a bracket that is configured to be removably secured to the tubular member via a plurality of fasteners.

38. The mast of claim 32, further comprising a base cap secured to a lower free end portion of the tubular member, and a top cap secured to an opposite upper free end portion of the tubular member.

39. The mast of claim 32, further comprising an elongate medial portion defining a third longitudinal axis, wherein one end of the medial portion is removably secured to the upper portion and an opposite end of the medial portion is removably secured to the lower portion such that the first, second and third axes are colinear.

40. An electrical power transmission tower, comprising:

a lattice structure comprising a lower end configured to be anchored to the ground, and an opposite upper end, the lattice structure comprising a plurality of parallel legs joined together in a polygonal cross-section configuration to define an internal space;

at least one support arm extending outwardly from the lattice structure, wherein the at least one support arm is configured to support at least one insulator suspended therefrom, wherein the at least one insulator is configured to support one or more electrical power transmission lines;

a mast movable within the internal space of the lattice structure along a vertical axis thereof between a lowered position and a raised position, wherein the mast is configured to support electronic equipment;

a plurality of upper guide arms and a plurality of lower guide arms longitudinally spaced apart from the plurality of upper guide arms extending outward from the mast, wherein each guide arm is movably engaged with a respective one of the legs such that the guide arms are movable along the legs as the mast is moved between the lowered position and the raised position;

wherein each leg comprises a docking clamp movably secured thereto, and wherein each docking clamp is configured to engage a respective one of the upper guide arms and restrain the mast when the mast is in the raised position; and a connecting rod secured to each docking clamp, and a tension binder secured to the ground, wherein the tension binder is configured to removably engage the connecting rod and restrain the docking clamp from movement when the mast is in the raised position.

41. An electrical power transmission tower, comprising:

a lattice structure comprising a lower end configured to be anchored to the ground, and an opposite upper end, the lattice structure comprising a plurality of parallel legs joined together in a polygonal cross-section configuration to define an internal space;

at least one support arm extending outwardly from the lattice structure, wherein the at least one support arm is configured to support at least one insulator suspended therefrom, wherein the at least one insulator is configured to support one or more electrical power transmission lines;

a mast movable within the internal space of the lattice structure along a vertical axis thereof between a lowered position and a raised position, wherein the mast is configured to support electronic equipment;

a plurality of guide arms extending outward from the mast, wherein each guide arm is movably engaged with a respective one of the legs such that the guide arms are movable along the legs as the mast is moved between the lowered position and the raised position; and a hoist assembly movably secured to the lattice structure within the internal space, wherein the hoist assembly is movable between a stowed position and an operative position, wherein the hoist assembly is configured to facilitate installation and removal of the electronic equipment from the mast when the mast is in the lowered position.

42. An electrical power transmission tower, comprising:

a lattice structure comprising a lower end configured to be anchored to the ground, and an opposite upper end, the lattice structure comprising a plurality of parallel legs joined together in a polygonal cross-section configuration to define an internal space;

at least one support arm extending outwardly from the lattice structure, wherein the at least one support arm is configured to support at least one insulator suspended therefrom, wherein the at least one insulator is configured to support one or more electrical power transmission lines;

a mast movable within the internal space of the lattice structure along a vertical axis thereof between a lowered position and a raised position, wherein the mast is configured to support electronic equipment;

a plurality of guide arms extending outward from the mast, wherein each guide arm is movably engaged with a respective one of the legs such that the guide arms are movable along the legs as the mast is moved between the lowered position and the raised position;

an elongate hollow conduit secured to the lattice structure, wherein the conduit comprises an open first end and an opposite open second end, wherein the conduit first end is positioned within the internal space adjacent the lattice structure lower end and the conduit second end is positioned within the internal space adjacent an intermediate portion of the lattice structure between the upper end and the lower end; and electrical cabling extending through the conduit and connected to electrical equipment on the mast, wherein the electrical cabling between the conduit second end and the mast is supported within a flexible cable carrier.

* * * * *